(12) United States Patent
Ji et al.

(10) Patent No.: US 9,351,205 B2
(45) Date of Patent: May 24, 2016

(54) CARRIER AGGREGATION CAPABLE MOBILE OPERATION OVER SINGLE FREQUENCY

(71) Applicant: QUALCOMM Incorporated, San Diego, CA (US)

(72) Inventors: Tingfang Ji, San Diego, CA (US); Durga Prasad Malladi, San Diego, CA (US); Yongbin Wei, San Diego, CA (US); Wanshi Chen, San Diego, CA (US); Rajat Prakash, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 13/831,550

(22) Filed: Mar. 14, 2013

(65) Prior Publication Data
US 2013/0310037 A1    Nov. 21, 2013

Related U.S. Application Data

(60) Provisional application No. 61/646,133, filed on May 11, 2012.

(51) Int. Cl.
*H04W 36/00* (2009.01)
*H04L 5/00* (2006.01)
(Continued)

(52) U.S. Cl.
CPC ......... *H04W 36/0083* (2013.01); *H04B 17/309* (2015.01); *H04B 17/382* (2015.01);
(Continued)

(58) Field of Classification Search
CPC ..... H04W 36/12; H04W 36/18; H04W 36/30; H04W 36/32; H04W 80/04
USPC ........................ 455/436–439; 370/331–332
See application file for complete search history.

(56) References Cited

U.S. PATENT DOCUMENTS 8,605,685 B2 * 12/2013 Song ................. H04W 36/0055
370/332
2009/0291686 A1 * 11/2009 Alpert ............... H04W 36/0083
455/436

(Continued)

FOREIGN PATENT DOCUMENTS

EP          2393320 A1     12/2011
WO       2011103745         9/2011
WO      2012061770 A2       5/2012

OTHER PUBLICATIONS

3GPP: "3rd Generation Partnership Project; Technical Specification Group Radio Access Network; HSDPA Multipoint Transmission; (Release 11)", 3GPP DRAFT; R1-112879_TR25872_V2.0.0, 3RD Generation Partnership Project (3GPP), Mobile Competence Centre; 650, Route Des Lucioles; F-06921 Sophia-Antipolis Cedex; France, vol. RAN WG1, no. Athens, Greece; Aug. 22, 2011, Sep. 8, 2011, XP050538024, [retrieved on Sep. 8, 2011] p. 8, lines 10-22; figures 8.2, 8.3, 8.6, 8.7 p. 27, lines 8-9.

(Continued)

Primary Examiner — Cong Tran
(74) Attorney, Agent, or Firm — Arent Fox LLP

(57) ABSTRACT

A method, an apparatus, and a computer program product for wireless communication are provided. The apparatus communicates with a primary serving cell via a first radio, detects a presence of a target cell, sends a first message to the primary serving cell indicating the detected presence of the target cell, receives a command from the primary serving cell to add the target cell as a secondary serving cell, and communicates with at least one of the primary serving cell or the target cell via a second radio to facilitate a handover to the target cell. The first radio and the second radio operate on a same frequency. A downlink control channel of the primary serving cell is not used to schedule a target cell downlink transmission. An uplink control channel to the primary serving cell is not used to provide an acknowledgment of the target cell downlink transmission. The uplink control channel to the primary serving cell is not used to provide channel side information for the target cell downlink transmission.

31 Claims, 21 Drawing Sheets

(51) Int. Cl.
  *H04B 17/309* (2015.01)
  *H04B 17/382* (2015.01)
  *H04W 36/18* (2009.01)

(52) U.S. Cl.
  CPC ............ *H04L 5/001* (2013.01); *H04L 5/0091* (2013.01); *H04W 36/0055* (2013.01); *H04L 5/0048* (2013.01); *H04L 5/0053* (2013.01); *H04L 5/0057* (2013.01); *H04W 36/18* (2013.01)

(56) References Cited

U.S. PATENT DOCUMENTS

| | | | | |
|---|---|---|---|---|
| 2010/0080192 | A1* | 4/2010 | Dong | H04B 1/70735 370/332 |
| 2010/0272268 | A1* | 10/2010 | Sambhwani | H04W 36/0055 380/287 |
| 2010/0330999 | A1* | 12/2010 | Larsson | H04W 36/08 455/439 |
| 2011/0269469 | A1* | 11/2011 | Xiao | H04W 36/0072 455/436 |
| 2012/0014357 | A1 | 1/2012 | Jung et al. | |
| 2012/0113839 | A1 | 5/2012 | Etemad | |
| 2012/0147869 | A1 | 6/2012 | Chhatriwala et al. | |
| 2012/0163338 | A1 | 6/2012 | Zhang et al. | |
| 2012/0281544 | A1* | 11/2012 | Anepu | H04B 7/0632 370/241 |
| 2012/0314685 | A1 | 12/2012 | Chen et al. | |

OTHER PUBLICATIONS

Ericsson et al., "Multi-point transmission techniques for HSPA", 3GPP DRAFT; R1-106251 Multi-Point Transmission Techniques for HSDPA, 3rd Generation Partnership Project (3GPP), Mobile Competence Centre; 650, Route Des Lucioles; F-06921 Sophia-Antipolis Cedex; France, vol. RAN WG1, no. Jacksonville, USA; Nov. 15, 2010, Nov. 9, 2010, XP050466967, [retrieved on Nov. 9, 2010] p. 15, lines 1-9.

International Search Report and Written Opinion—PCT/US2013/032557—ISA/EPO—Jan. 7, 2014.

4G Americas, "HSPA + LTE Carrier Aggregation," Jun. 2012, pp. 1-37.

* cited by examiner

CARRIER AGGREGATION CAPABLE MOBILE OPERATION OVER SINGLE FREQUENCY

CROSS-REFERENCE TO RELATED APPLICATION(S)

This application claims the benefit of U.S. Provisional Application Ser. No. 61/646,133, entitled "CARRIER AGGREGATION CAPABLE MOBILE OPERATION OVER SINGLE FREQUENCY" and filed on May 11, 2012, which is expressly incorporated by reference herein in its entirety.

BACKGROUND

1. Field

The present disclosure relates generally to communication systems, and more particularly, to managing mobility of a mobile terminal configured for carrier aggregation over two cells on a same frequency.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

To achieve high peak data rates in the downlink and uplink, a large transmission bandwidth may be necessary. However, because the availability of large portions of contiguous spectrum may be rare, carrier aggregation of multiple component carriers may be implemented to achieve high-bandwidth transmission. Hence, operators with fragmented spectrum may use carrier aggregation to reach higher peak data rates. Carrier aggregation also allows a UE to receive and transmit on two carrier frequencies.

However, when a network is loaded, such as when a peak data rate is not limited by UE capability, carrier aggregation may not offer a performance gain. Carrier aggregation may be disabled when spectrum or infrastructure for a supported carrier aggregation band combination is not available. As such, alternative ways of implementing a carrier aggregation scheme are needed to realize performance benefits.

In an aspect, when the UE is configured for carrier aggregation over two cells on a same frequency, and the UE communicates with each cell via a respective radio tuned to the same frequency, the UE may utilize the two radios to enhance performance. For example, the UE may utilize the two radios of the carrier aggregation scheme to implement a coordinated multipoint (CoMP) scheme if base stations of a corresponding network have a fast or high throughput backhaul topology. Alternatively, the UE may utilize the two radios of the carrier aggregation scheme to enhance mobility from one cell to another.

In an aspect of the disclosure, a method, an apparatus, and a computer program product for wireless communication are provided. The apparatus communicates with a primary serving cell via a first radio, detects a presence of a target cell, sends a first message to the primary serving cell indicating the detected presence of the target cell, receives a command from the primary serving cell to add the target cell as a secondary serving cell, and communicates with at least one of the primary serving cell or the target cell via a second radio to facilitate a handover to the target cell, wherein the first radio and the second radio operate on a same frequency, a downlink control channel of the primary serving cell is not used to schedule a target cell downlink transmission, an uplink control channel to the primary serving cell is not used to provide an acknowledgment of the target cell downlink transmission, and the uplink control channel to the primary serving cell is not used to provide channel side information for the target cell downlink transmission.

In a further aspect, the apparatus communicates with a user equipment (UE) via a first radio at a primary serving cell, communicates with the UE via a second radio at a target cell, receives, at the primary serving cell, a first message from the UE indicating a detected presence of the target cell, and sends a second message from the primary serving cell to the UE, the second message including a command to add the target cell as a secondary serving cell, wherein a downlink control channel of the primary serving cell is not used to schedule a target cell downlink transmission, an uplink control channel to the primary serving cell is not used to provide an acknowledgment of the target cell downlink transmission, and the uplink control channel to the primary serving cell is not used to provide channel side information for the target cell downlink transmission.

In another aspect, the apparatus sends a capability message to at least one of a primary serving cell or a secondary serving cell, the capability message indicating a capability of communicating via a first component carrier and a second component carrier operating on a same frequency, communicates with the primary serving cell via the first component carrier, communicates with the secondary serving cell via the second component carrier, and receives data samples from both the primary serving cell and the secondary serving cell.

In yet another aspect, the apparatus communicates with a primary serving cell via a single radio, and communicates with a target cell via the single radio to facilitate a handover to the target cell, wherein the communication with the primary serving cell is time-division multiplexed with the communication with the target cell, a downlink control channel of the primary serving cell is not used to schedule a target cell downlink transmission, an uplink control channel to the primary serving cell is not used to provide an acknowledgment of the target cell downlink transmission, and the uplink control channel to the primary serving cell is not used to provide channel side information for the target cell downlink transmission.

In yet a further aspect, the apparatus communicates with a user equipment (UE) via a single radio at a primary serving cell, communicates with the UE via the single radio at a target cell, receives, at the primary serving cell, a first message from the UE indicating a detected presence of the target cell, and sends a second message from the primary serving cell to the UE, the second message including a request to report channel quality information (CQI) related to the primary serving cell and the target cell, wherein the communication with the UE at the primary serving cell is time-division multiplexed with the communication with the UE at the target cell.

DETAILED DESCRIPTION

Figure 1:
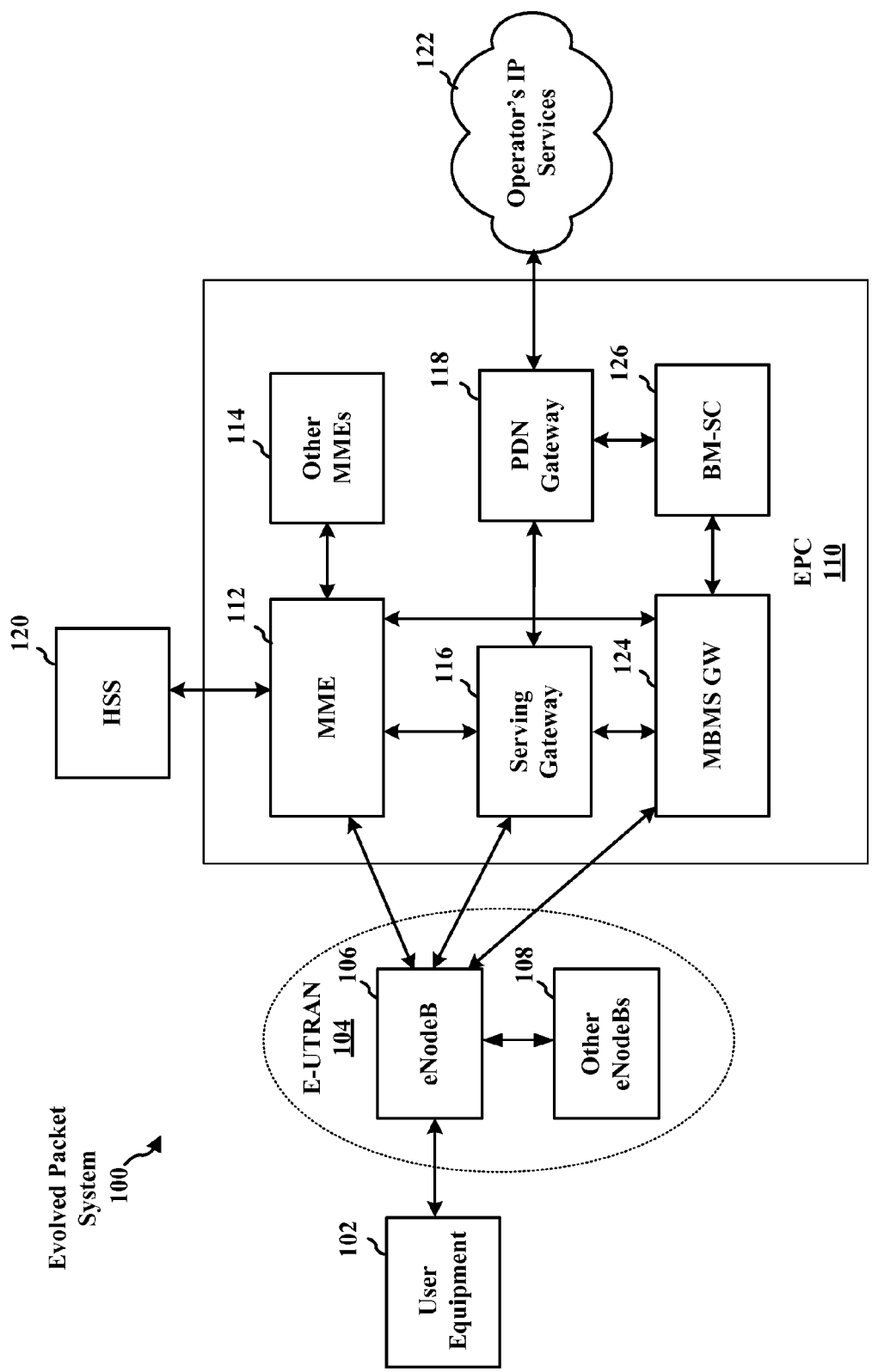
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
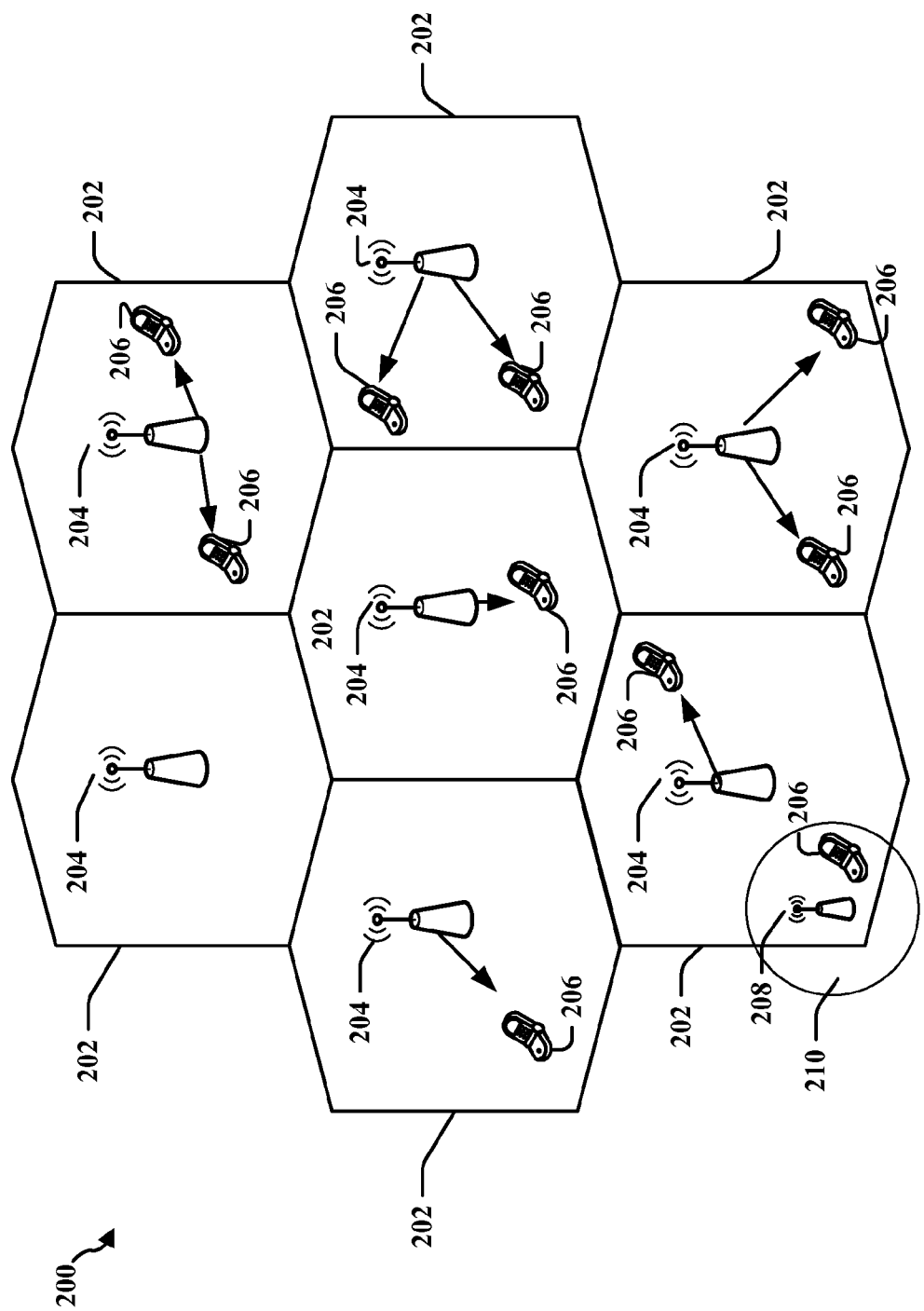
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
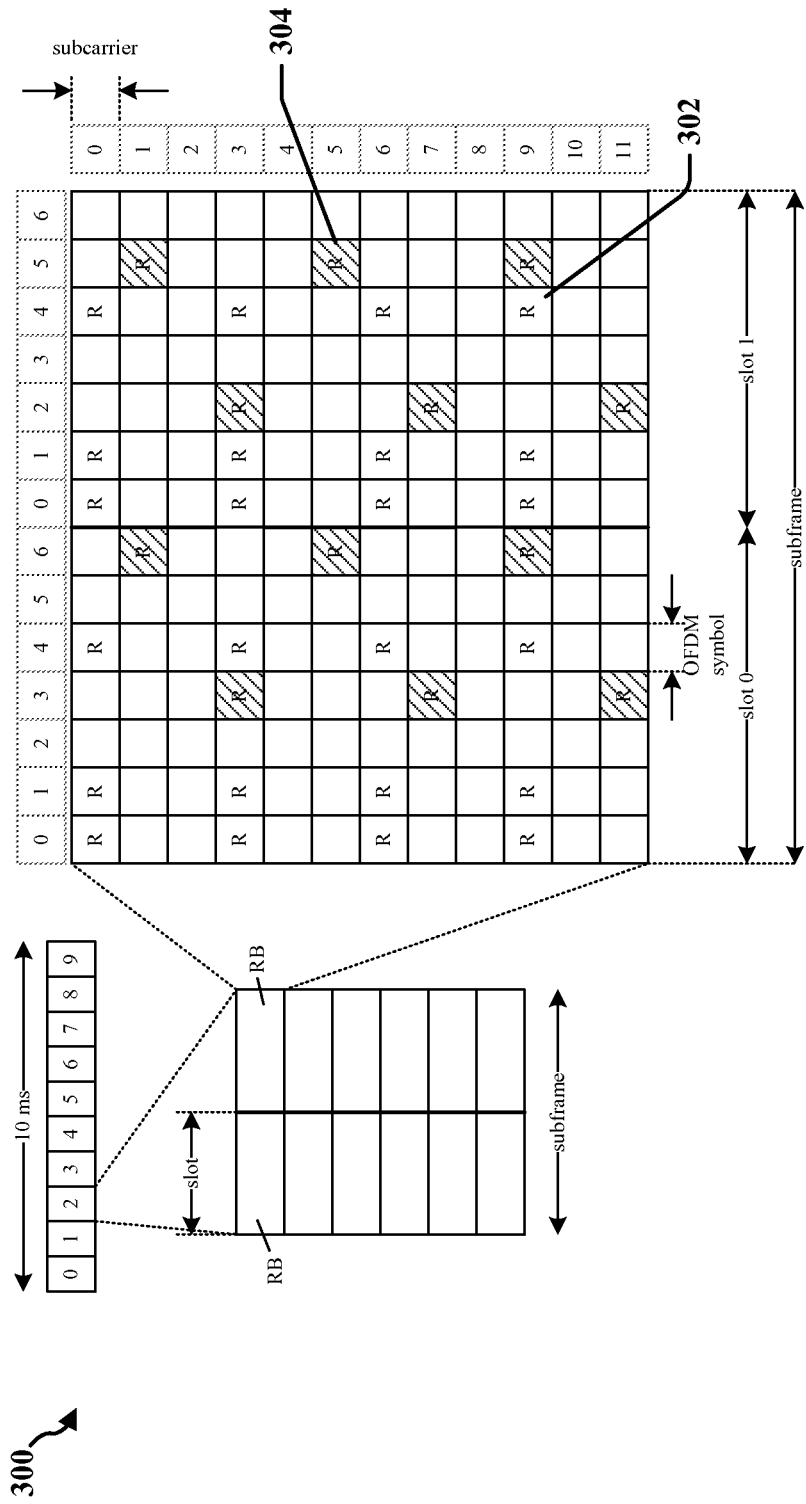
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
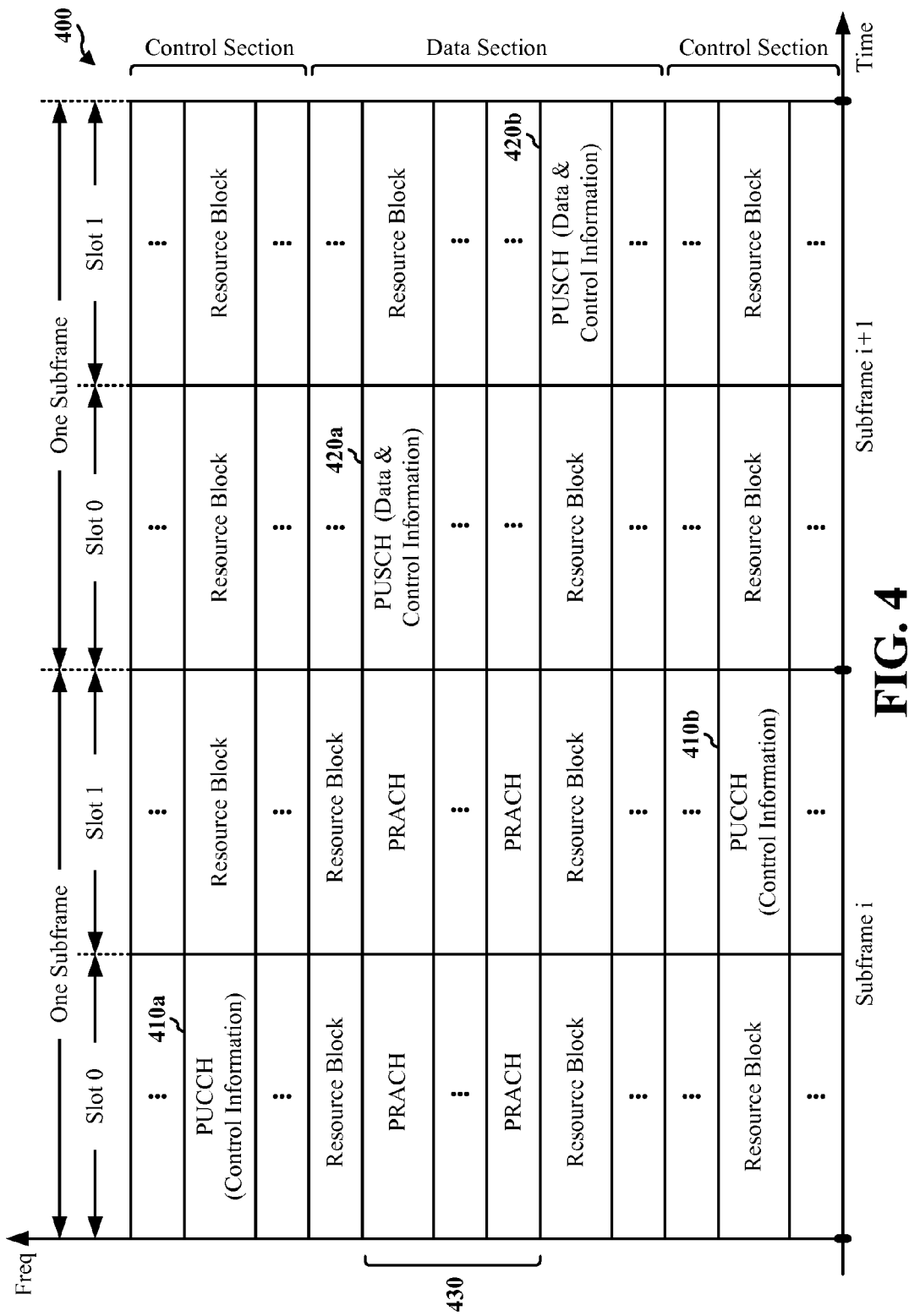
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
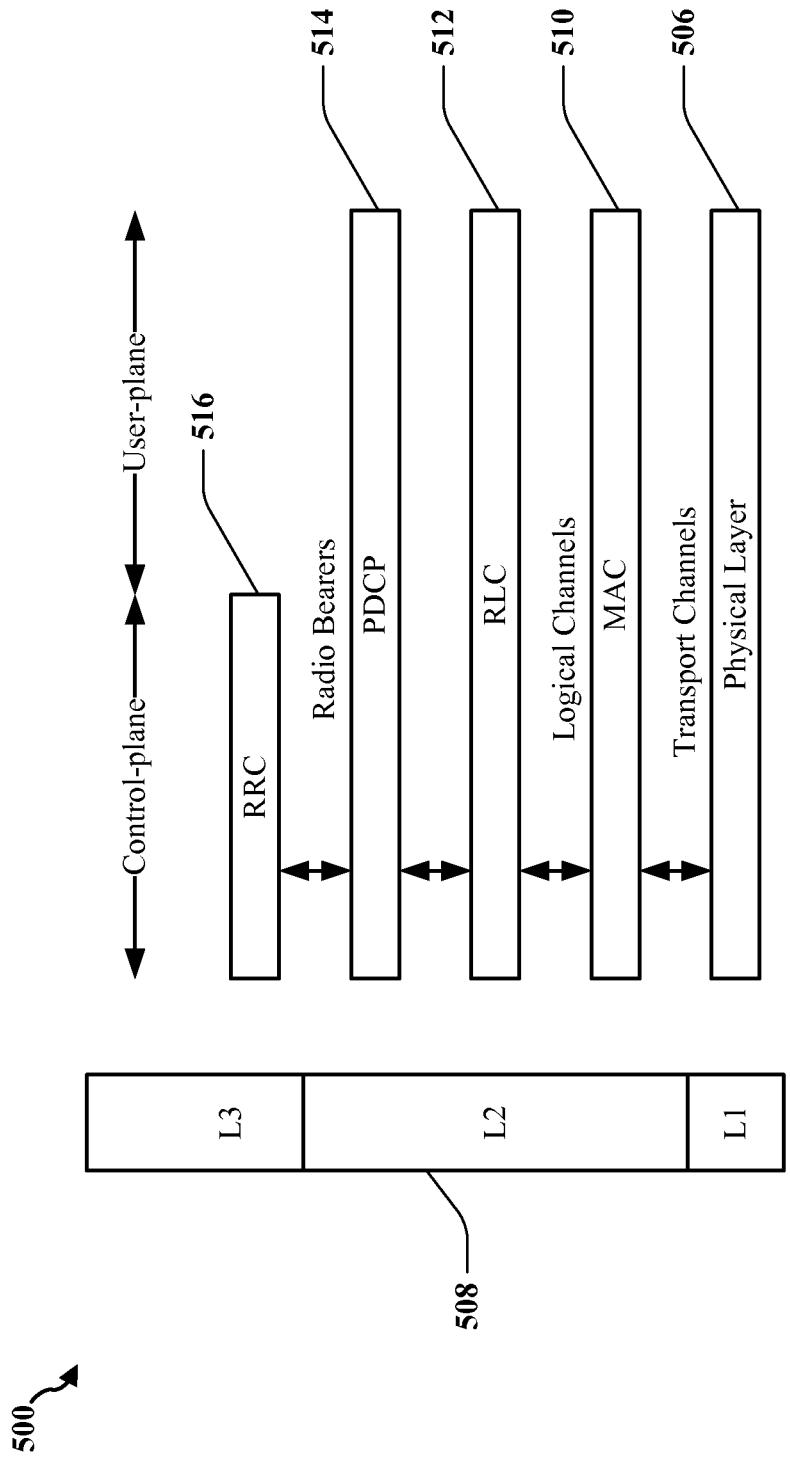
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
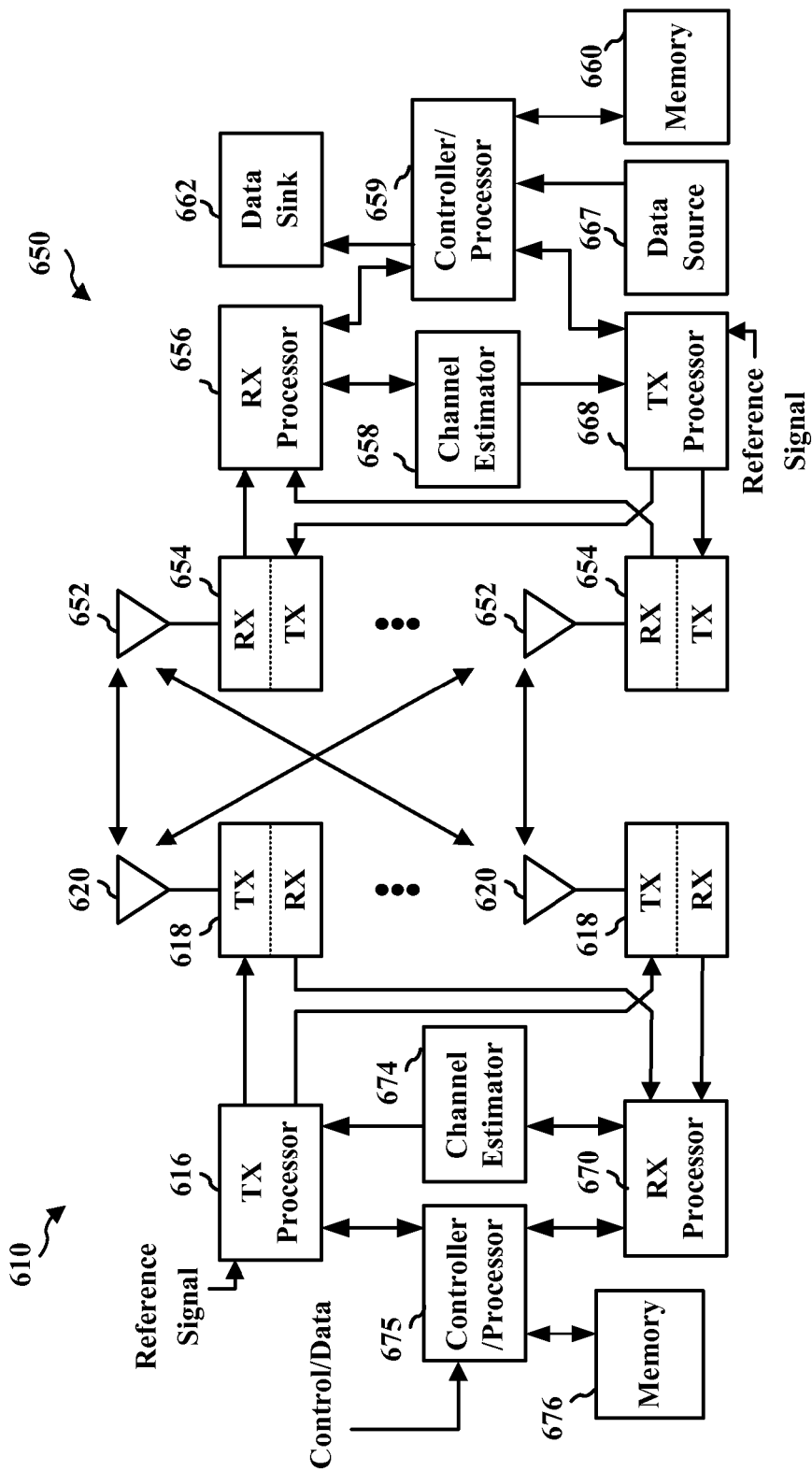
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
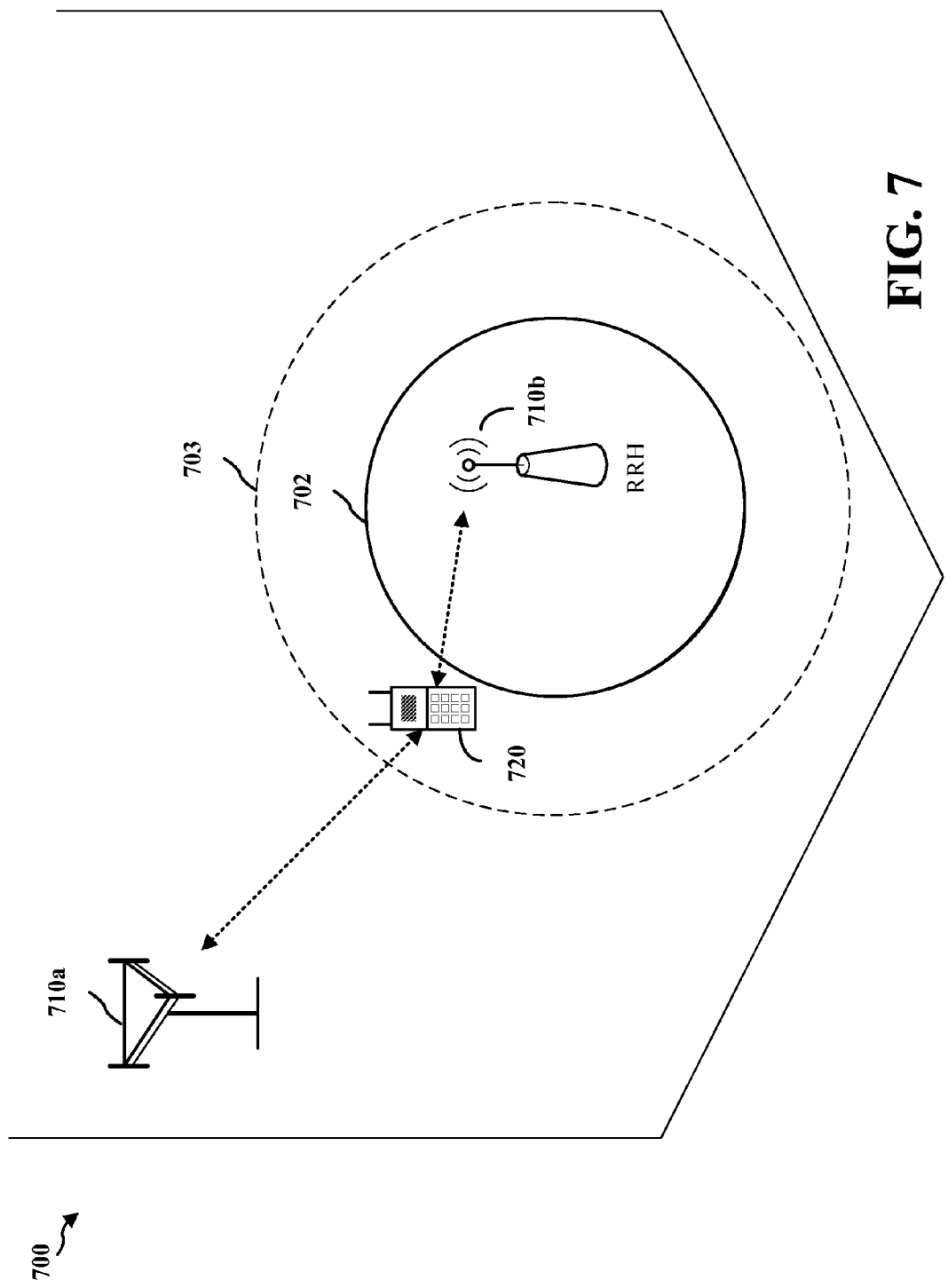
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Carrier aggregation is a popular feature among network operators with fragmented spectrum to achieve a higher peak data rate. Coordinated multipoint (CoMP) may provide better network spectral efficiency through the use of inter-node coordination, especially for remote radio head (RRH) deployments. Enhanced inter-cell interference coordination (eICIC) enables interference mitigation between macro and pico/RRH, which leads to cell range expansion and more robust mobility performance. Accordingly, a UE may benefit from combining various features of the above-described schemes.

In an aspect, a configured set of serving cells for a UE comprises one primary serving cell (PCell) and one or more secondary serving cells (SCells). A PCell may be defined as a cell that is initially configured during connection establishment. An SCell is a cell that may be configured after connection establishment, such as to provide additional radio resources. For each SCell the usage of uplink resources by the UE in addition to the downlink resources is configurable. For example, the number of downlink secondary component carriers (SCCs) configured may be larger than or equal to the number of uplink SCCs, and no SCell may be configured for usage of uplink resources only. From a UE viewpoint, each uplink resource belongs to one serving cell. The number of serving cells that can be configured may depend on aggregation capability of the UE. A PCell may be changed via a handover procedure (i.e., with a security key change and RACH procedure). The PCell may be used for transmitting PUCCH.

Unlike SCells, a PCell may not be deactivated. Re-establishment may be triggered when the PCell communication link experiences radio link failure (RLF), not when SCell links experience RLF. Non-access stratum (NAS) information may be taken from the PCell. The reconfiguration, addition, and removal of SCells may be performed by RRC. At intra-LTE handover, RRC can also add, remove, or reconfigure SCells for usage with the target PCell. When adding a new SCell, dedicated RRC signaling may be used for sending system information of the SCell. For example, while in connected mode, a UE need not acquire broadcasted system information from the SCells. In carrier aggregation, whenever a UE is configured with only one serving cell (e.g., a PCell) LTE Rel-8/9 DRX may apply. In other cases, the same DRX operation applies to all configured and activated serving cells (e.g., identical active time for PDCCH monitoring).

When an SCell is inactive, the UE does not need to receive the corresponding PDCCH or PDSCH, may not transmit on the corresponding uplink, nor is the UE required to perform CQI measurements. Conversely, when an SCell is active, the UE may receive PDSCH and PDCCH (if the UE is configured to monitor PDCCH from the SCell), and is expected to perform CQI measurements. The activation/deactivation mechanism may be based on a combination of a MAC control element and deactivation timers. The MAC control element may carry a bitmap for the activation and deactivation of SCells: a bit in the bitmap set to 1 may denote activation of the corresponding SCell, while a bit in the bitmap set to 0 may denote deactivation of the corresponding SCell. With the bitmap, SCells can be activated and deactivated individually, and a single activation/deactivation command can activate/deactivate all or a subset of the SCells. One deactivation timer may be maintained per SCell but one common activation/deactivation command value is configured per UE by RRC.

At reconfiguration without mobility control information: 1) SCells added to the set of serving cells are initially "deactivated"; and 2) SCells which remain in the set of serving cells (either unchanged or reconfigured) do not change their activation status ("activated" or "deactivated"). At reconfiguration with mobility control information (e.g., handover), SCells are "deactivated."

The UE may apply system information acquisition and change monitoring procedures for the PCell. For an SCell, E-UTRAN provides, via dedicated signaling, system information relevant for UE operation in an RRC_CONNECTED state when adding the SCell. Upon change of the relevant system information of a configured SCell, E-UTRAN releases the SCell and subsequently adds the configured SCell to the set of serving cells, which may be done with a single RRCConnectionReconfiguration message.

When the UE is in the RRC_CONNECTED state, the network may control UE mobility, e.g., the network decides when the UE connects to which E-UTRA cell(s), or inter-RAT cell. For network controlled mobility of a UE in a RRC_CONNECTED state, the current serving PCell can be changed using an RRCConnectionReconfiguration message including a mobilityControlInfo message (handover), whereas the current SCell(s) can be changed using the RRCConnectionReconfiguration message either with or without the mobilityControlInfo message. The network may trigger the handover procedure, e.g., based on radio conditions or load. To facilitate the handover procedure, the network may configure the UE to perform measurement reporting (possibly including the configuration of measurement gaps). The network may also initiate handover blindly, e.g., without having received measurement reports from the UE.

To achieve high peak data rates in the downlink and uplink, a large transmission bandwidth may be necessary. However, because the availability of large portions of contiguous spectrum may be rare, carrier aggregation of multiple component carriers may be implemented to achieve high-bandwidth transmission. Hence, operators with fragmented spectrum may use carrier aggregation to reach higher peak data rates. Moreover, carrier aggregation allows a UE to receive and transmit on two carrier frequencies.

Regarding band agnostic support of carrier aggregation, UE capabilities may include: 1) connected mode only; 2) primary cell and secondary cell management (configuration, activation); 3) measurement and reporting (radio resource management (RRM), channel quality information (CQI), etc.); and 4) simultaneous decoding of PDCCH and PDSCH in the baseband. Regarding band specific support of carrier aggregation, UE capabilities may include: 1) intra-band radio frequency (RF) requirements (e.g., capabilities for aggregating carriers within a frequency band); and 2) inter-band RF requirements (e.g., capabilities for aggregating carriers across different frequency bands).

Notably, when a network is loaded, e.g., when a peak data rate is not limited by UE capability, carrier aggregation may not offer a performance gain. Moreover, carrier aggregation may be disabled when spectrum or infrastructure for a supported carrier aggregation band combination is not available. As such, performance benefits of carrier aggregation may be limited to: 1) a peak data rate increase in lightly loaded networks at locations where carrier aggregation capable eNBs and supported carrier aggregation band combinations are available; and 2) a supplementary data carrier for opportunistic access.

In an aspect, carrier aggregation may be modified to make use of baseband capability of carrier aggregation capable UEs in all bands. Consequently, UEs not capable of carrier aggregation may find value in implementing signaling support of a modified carrier aggregation scheme. In one example of a modified carrier aggregation scheme, UEs capable of carrier aggregation may connect to two cells on the same frequency.

In another example of a modified carrier aggregation scheme, UEs may aggregate four receive antennas to a single frequency. For example, a UE capable of carrier aggregation via two carriers may have two receive antennas configured for each carrier (a total of four receive antennas). When the UE is deployed on a single carrier, the UE may utilize all four receive antennas to receive the same frequency.

When the UE is configured for carrier aggregation over two cells on the same frequency, the UE may also be configured for inter-band carrier aggregation and/or intra-band carrier aggregation. For uplink carrier aggregation capable UEs, the UE may disable simultaneous transmission via a first component carrier and a second component carrier operating on the same frequency (e.g., disable simultaneous transmission of PUSCH/PUCCH) to avoid self-interference.

In another example, for intra-band carrier aggregation capable UEs, when the UE implements a single radio scheme, the UE may be capable of receiving data samples simultaneously from both a primary cell (via a first component carrier) and a secondary cell (via a second component carrier). To enable these types of UEs to receive on two carriers on the same frequency, certain parameters (e.g., local oscillator (LO), fast Fourier transform (FFT), etc.) may be reconfigured. When the UE implements a multiple radio scheme, multiple antennas and Tx/RX chains for different component carriers are provided.

Furthermore, when the UE is configured for carrier aggregation over two cells on the same frequency, the UE may signal such capability to the network. For example, the UE may send a capability message to the primary cell or the secondary cell indicating whether the UE is capable of communicating via the first component carrier and the second component carrier operating on the same frequency. If the UE does not have the baseband power to simultaneously receive data samples via the first component carrier and the second component carrier (e.g., simultaneous reception of PDSCH/PDCCH), the capability message may indicate that a baseband receiver is incapable of simultaneously receiving via both the first component carrier and the second component carrier. Although the baseband receiver may be incapable of simultaneous reception via both component carriers, the UE may still receive the data samples in a non-simultaneous manner via the first component carrier and second component carrier when the data samples from the primary cell and the secondary cell are time-division multiplexed. Because the transmissions from the primary cell and the secondary cell do not overlap, the UE with a single radio can decode each cell, one at a time. A time-division multiplexing (TDM) pattern may be defined between the primary cell and the secondary cell.

In an aspect, when the UE is configured for carrier aggregation over two cells on the same frequency, and the UE communicates with each cell via a respective radio tuned to the same frequency, the UE may utilize the two radios to enhance performance. For example, the UE may utilize the two radios in the carrier aggregation scheme to implement a coordinated multipoint (CoMP) scheme if base stations of a corresponding network have a fast or high throughput backhaul topology. Alternatively, the UE may utilize the two radios in the carrier aggregation scheme to enhance mobility from one cell to another.

Figure 8:
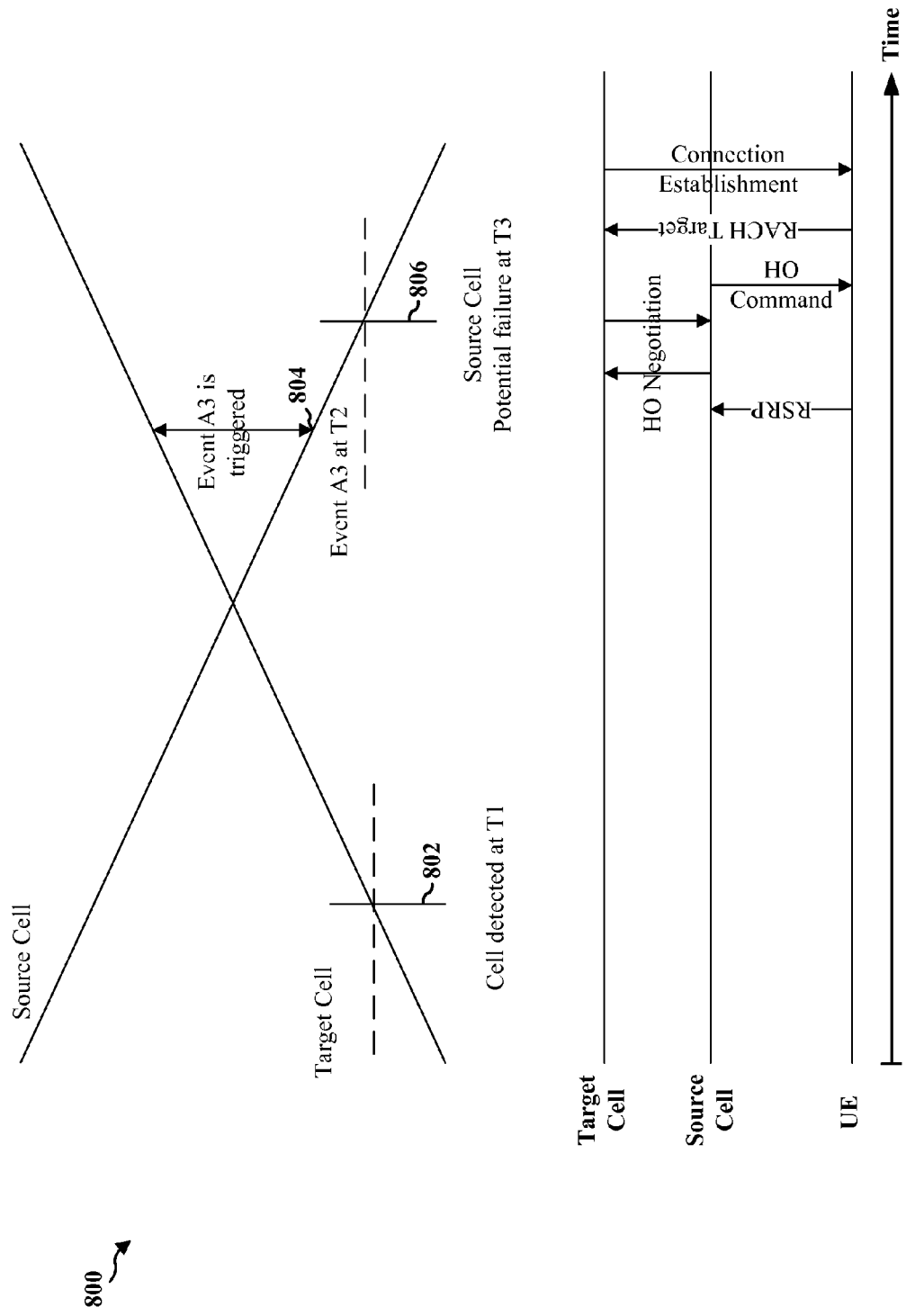
FIG. 8 is a diagram illustrating a UE mobility procedure.

FIG. 8 is a diagram 800 illustrating a UE mobility procedure. Referring to FIG. 8, channel strength of a source cell (or primary serving cell) may decrease while channel strength of a target cell (or secondary serving cell) increases as the UE moves. At time T1 (802), the UE may detect a presence of the target cell. At time T2 (804), an event A3 may be detected for triggering a handover operation. In FIG. 8, the event A3 may be defined as the channel strength of the target cell exceeding the channel strength of the source cell by a certain amount. When the event A3 is detected, the UE may provide a reference signal receive power (RSRP) measurement to the source cell indicating that the channel strength of the target cell exceeds the channel strength of the source cell. When the RSRP measurement is provided to the source cell, the source cell may consider a handover of the UE from the source cell to the target cell, which may include a handover negotiation between the source cell and the target cell. When the handover is agreed upon between the source cell and the target cell, the source cell may send a handover command to the UE. Upon receiving the handover command from the source cell, the UE may perform a RACH procedure with the target cell in order to establish a connection with the target cell. When the handover to the target cell is complete, the source cell may be considered as a secondary serving cell, or removed from a set of serving cells, while the target cell may be considered as the new primary serving cell.

Figure 9:
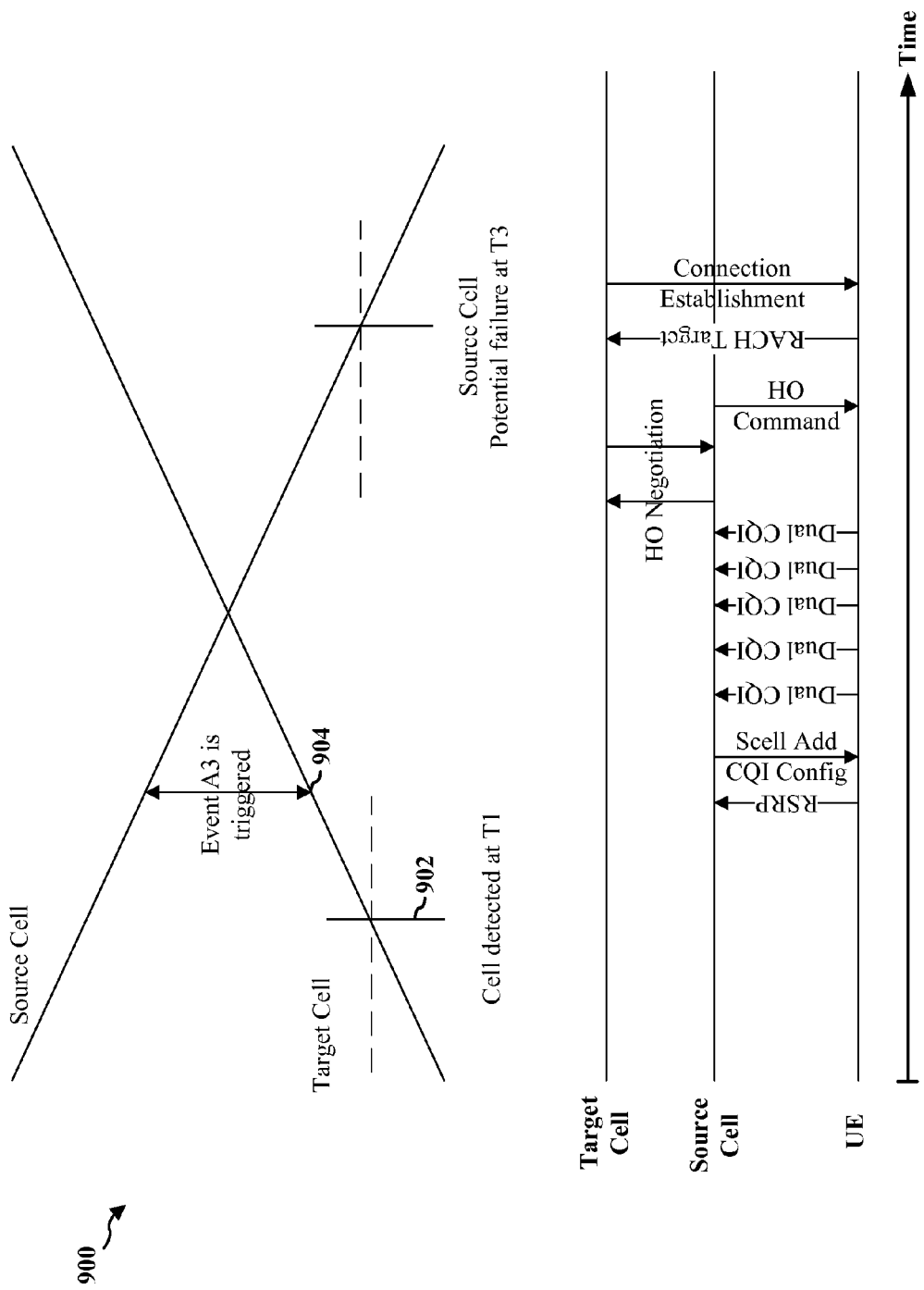
FIG. 9 is a diagram illustrating a UE mobility procedure incorporating a carrier aggregation scheme.

FIG. 9 is a diagram 900 illustrating a UE mobility procedure for use with a carrier aggregation scheme. The UE mobility procedure of FIG. 9 may operate with a legacy secondary serving cell (SCell). The UE may communicate with the source cell (e.g., primary serving cell) via a first radio and communicate with the target cell (e.g., secondary serving cell) via a second radio, wherein the first radio and the second radio may operate on a same frequency.

As shown in FIG. 8, at time T3 (806), failure may occur at the source cell prior to the UE successfully receiving the handover command. Accordingly, FIG. 9 provides a procedure for using channel quality information (CQI) reported from the UE to improve a handover decision made at the source cell. Referring to FIG. 9, after the target cell is detected at time T1 (902), an event A3 may be detected (904). The event A3 of FIG. 9 may be different from the event A3 of FIG. 8. For example, in FIG. 9, the event A3 may be defined as the target cell being detectable and/or measurable. Moreover, the event A3 of FIG. 9 may be detected not to trigger handover, but to trigger management of component carriers (e.g., primary cell/secondary cell management) in the carrier aggregation scheme.

When the event A3 is detected, the UE may provide a reference signal receive power (RSRP) measurement to the source cell indicating the detection of the target cell. When the RSRP measurement is received by the source cell, the source cell may send a CQI request message (e.g., Secondary cell (SCell) Add CQI config message) to the UE requesting the UE to report channel quality information (CQI) related to the source cell and CQI information related to the target cell (may be referred to herein as CQI reporting), in order for the source cell to determine downlink channel conditions. When the UE receives the CQI request message, the UE activates the second radio to communicate with, and measure the CQI related to, the target cell. Thereafter, the UE may send one or more CQI reports related to both the source cell and the target cell (dual CQI) allowing the source cell to determine the downlink channel conditions of both the source cell and the target cell. Hence, the CQI reports related to both the source cell and the target cell may be used by the source cell to make an informed decision regarding handover of the UE from the source cell to the target cell.

After some time, when the source cell determines that the channel strength of the target cell is sufficient to service the UE, the source cell negotiates the handover with the target cell. After the handover is agreed upon between the source cell and the target cell, the source cell may send a handover command to the UE. Upon receipt of the handover command, the UE may perform a RACH procedure with the target cell to establish a connection with the target cell. When the handover to the target cell is complete, the source cell may be considered as a secondary serving cell, or removed from a set of serving cells, while the target cell may be considered as the new primary serving cell. In this situation, the handover negotiation may be started sooner to minimize failure due to the source cell link (e.g., radio link failure, poor channel quality, poor reception quality, etc.). Alternatively, the handover negotiation may be started sooner to minimize failure at the target cell, or to minimize the chances of failure at either the source cell or the target cell.

Figure 10:
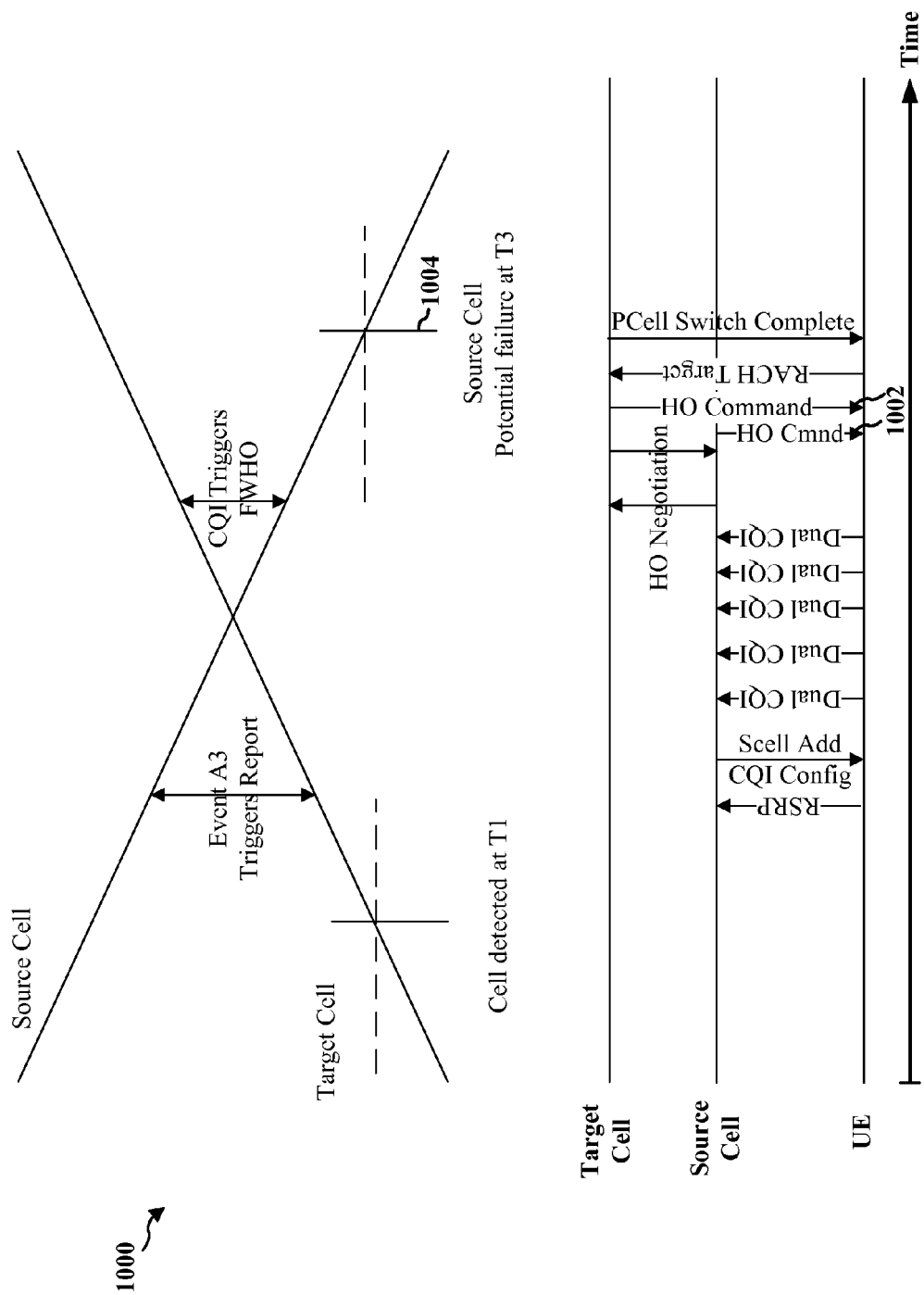
FIG. 10 is a diagram illustrating a UE mobility procedure incorporating a carrier aggregation scheme.

FIG. 10 is a diagram 1000 illustrating another UE mobility procedure for use with a carrier aggregation scheme. The UE mobility procedure of FIG. 10 provides better handover command robustness. The UE may communicate with the source cell (e.g., primary serving cell) via a first radio and communicate with the target cell (e.g., secondary serving cell) via a second radio, wherein the first radio and the second radio may operate on a same frequency. The procedure of FIG. 10 is similar to the procedure described above with respect to FIG.

9 except that the handover command (1002) may be sent from both the source cell and the target cell, or the target cell alone.

In FIG. 10, handover negotiation may start between the source cell and the target cell. Once the target cell acquires enough information, the handover may be completed by the target cell even when the source cell link fails. For example, referring to FIG. 10, at time T3 (1004), there may be a high chance of the source cell link failing, e.g., because the SNR of the link is too low. Thus, sending the handover command from the target cell (e.g., forward handover) may be desired as the target cell's increased channel strength provides a lower chance of handover failure. Sending the handover command from both the source cell and the target cell, or the target cell alone, increases the chance of the UE receiving handover information when the source cell link is prone to failure. Since the UE is capable of carrier aggregation, the UE can decode the handover command from the source cell and the target cell at the same time.

Figure 11:
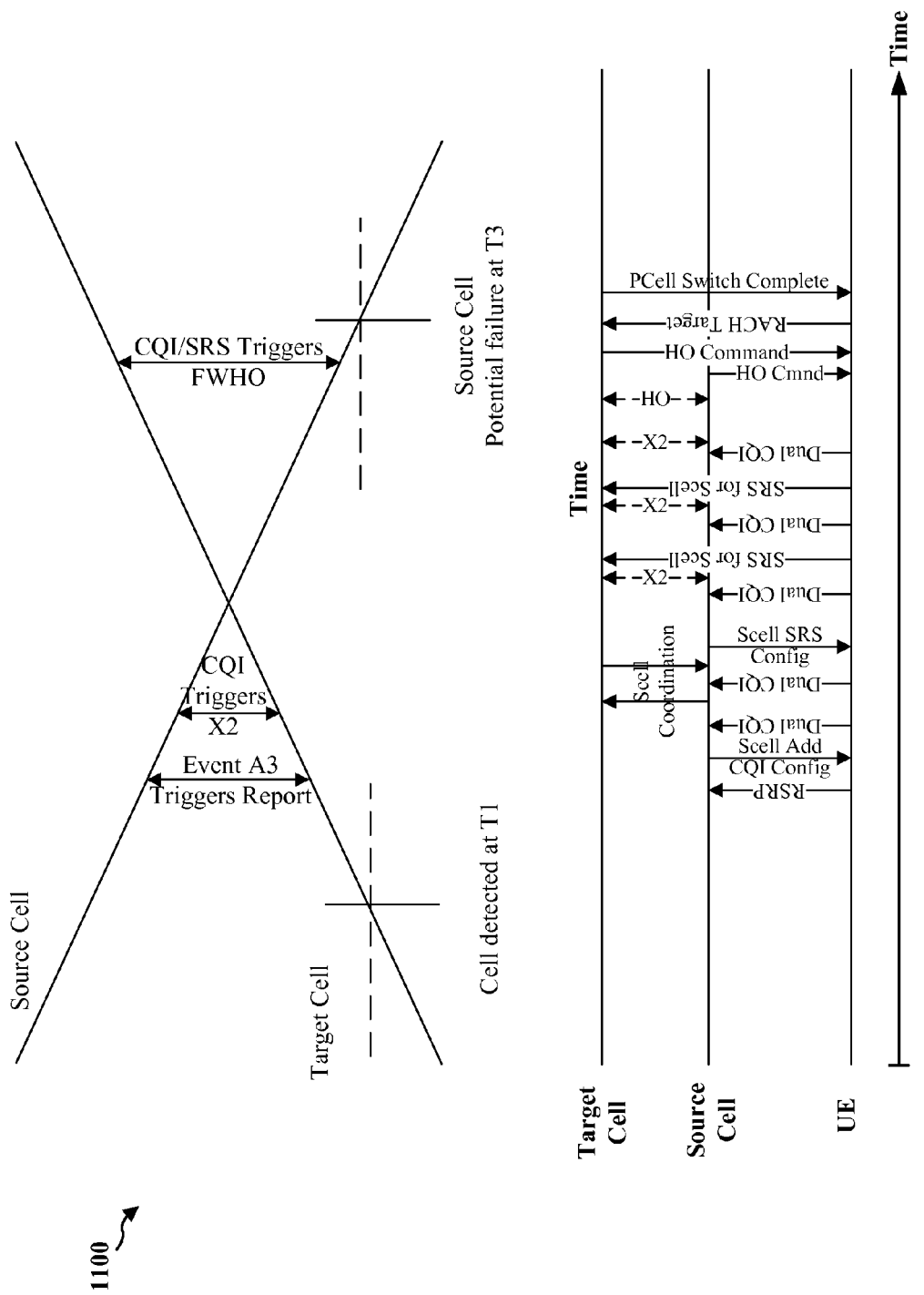
FIG. 11 is a diagram illustrating a UE mobility procedure incorporating a carrier aggregation scheme.

FIG. 11 is a diagram 1100 illustrating another UE mobility procedure for use with a carrier aggregation scheme. The UE mobility procedure of FIG. 11 improves uplink monitoring by the source cell (e.g., primary serving cell) and the target cell (e.g., secondary serving cell), thus improving a handover decision made at the source cell and/or the target cell. The UE may communicate with the source cell via a first radio and communicate with the target cell via a second radio. The first radio and the second radio may operate on a same frequency. In FIG. 11, a UE mobility procedure is further enhanced by allowing the source cell and the target cell to actively exchange UE information, e.g., via an X2 backhaul. In particular, upon receiving a CQI report related to both the source cell and the target cell (dual CQI), the source cell may begin coordinating with the target cell (secondary cell (SCell)) to exchange UE information via X2 (e.g., SCell coordination).

The source cell and target cell may exchange information to address uplink issues. For example, handover failure may be due to uplink failure (e.g., uplink communication at the target cell is poor but downlink communication at the target cell is sufficient). As a result, the source cell may send a sounding reference signal (SRS) request message (e.g., SCell SRS config message) to the UE requesting the UE to send SRS to the target cell in order for the target cell to determine an uplink channel condition. When the UE receives the SRS request message, the UE may send one or more SRS to the target cell allowing the target cell to determine the uplink channel conditions. As shown in FIG. 11, and described with respect to FIG. 9, the source cell receives one or more CQI reports related to both the source cell and the target cell (dual CQI) allowing the source cell to determine the downlink channel conditions at the UE for both the source cell and the target cell. Notably, the target cell's knowledge of the uplink channel condition, and the source cell's knowledge of the downlink channel conditions may be exchanged between the source cell and the target cell via the X2. This allows the source cell and/or the target cell to make an informed decision regarding handover of the UE from the source cell to the target cell.

After some time, the source cell and/or target cell may trigger the handover based on the dual CQI (downlink channel condition) and the SRS (uplink channel condition) prompting the source cell and the target cell to negotiate the handover. After the handover is agreed upon, the source cell and/or the target cell may send a handover command to the UE. Upon receipt of the handover command, the UE may perform a RACH procedure with the target cell to establish a connection with the target cell. This approach may be advantageous when there may be a high chance of the source cell link or the target cell link failing during handover, e.g., because the SNR of either link is too low. Thus, sending the handover command from both the source cell and the target cell may be desired to achieve transmit diversity, which increases the chance of the UE receiving handover information when the source cell link or the target cell link is prone to failure. When the handover to the target cell is complete, the source cell may be considered as a secondary serving cell, or removed from a set of serving cells, while the target cell may be considered as the new primary serving cell.

Figure 12:
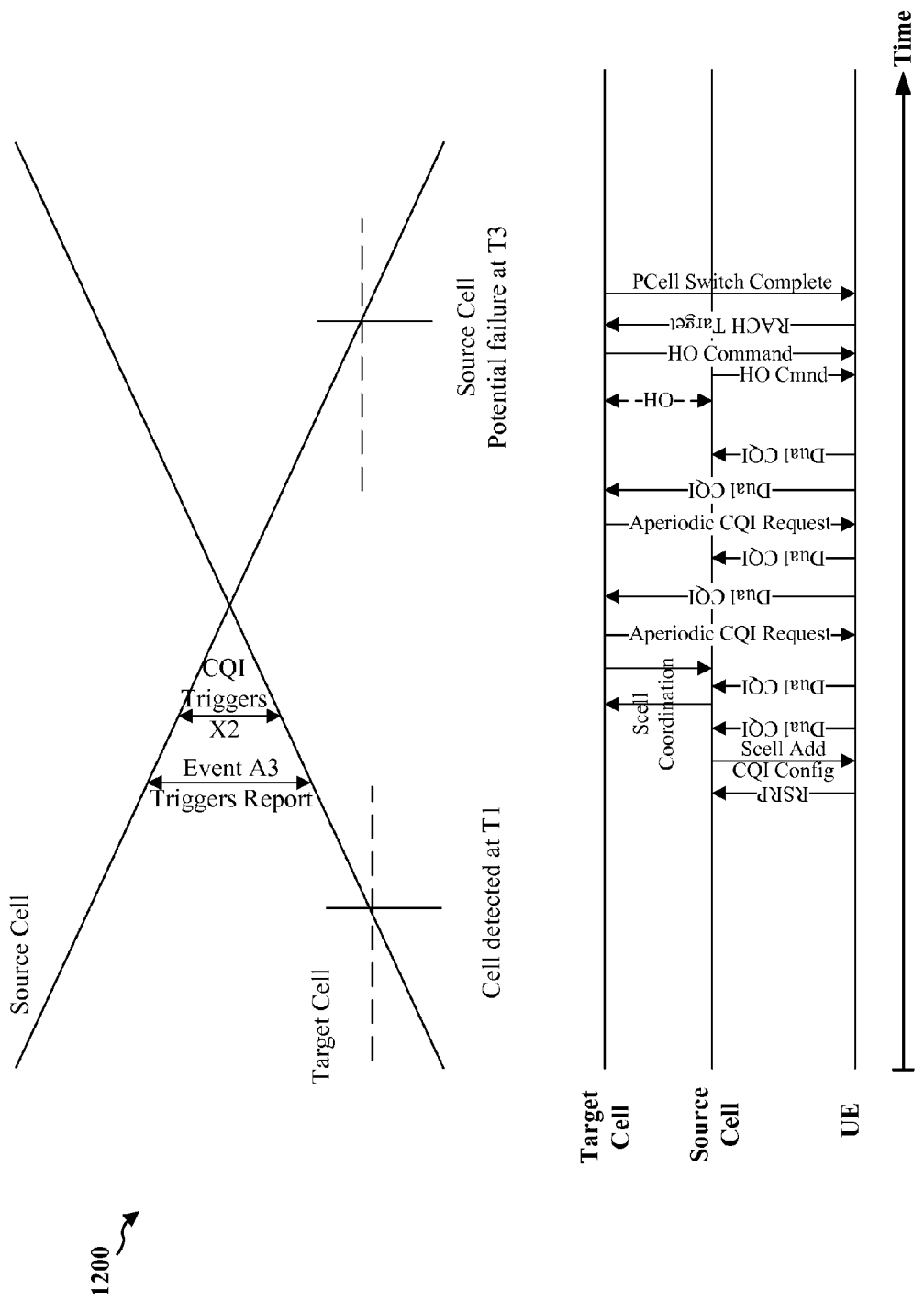
FIG. 12 is a diagram illustrating a UE mobility procedure incorporating a carrier aggregation scheme.

FIG. 12 is a diagram 1200 illustrating yet another UE mobility procedure for use with a carrier aggregation scheme. The UE mobility procedure of FIG. 12 allows handover to be more independent of the source cell (e.g., primary serving cell). Thus, even when the source cell fails (downlink or uplink), the target cell (e.g., secondary serving cell) may complete the handover operation. The UE may communicate with the source cell via a first radio and communicate with the target cell via a second radio. The first radio and the second radio may operate on a same frequency. In FIG. 12, a UE mobility procedure is further enhanced by allowing the target cell to receive CQI reports related to both the source cell and the target cell (dual CQI). Hence, both the source cell and the target cell may receive the dual CQI.

For example, after the source cell coordinates with the target cell (SCell) to exchange UE information via X2 (e.g., SCell coordination), the target cell may send an aperiodic CQI request to the UE requesting the UE to send to the target cell CQI reports related to both the source cell and the target cell (dual CQI). This allows the target cell to determine a downlink channel condition for both the source cell link and the target cell link. All periodic CQIs may be sent to the source cell (primary cell (PCell)). As such, the source cell and the target cell do not need to utilize the X2 backhaul to exchange information regarding the dual CQI. Thus, the target cell may make an informed decision regarding handover of the UE from the source cell to the target cell. Moreover, even though the source cell link fails, the dual CQI is not lost because the target cell may independently receive the dual CQI from the UE after sending the aperiodic CQI request to the UE.

After some time, the source cell and/or target cell may trigger the handover based on the dual CQI (downlink channel condition) prompting the source cell and the target cell to negotiate the handover. After the handover is agreed upon, the source cell and/or the target cell may send a handover command to the UE. Upon receipt of the handover command, the UE may perform a RACH procedure with the target cell to establish a connection with the target cell. This approach may be advantageous when there may be a high chance of the source cell link or the target cell link failing during handover, e.g., because the SNR of either link is too low. Thus, sending the handover command from both the source cell and the target cell may be desired to achieve transmit diversity, which increases the chance of the UE receiving handover information when the source cell link or the target cell link is prone to failure. When the handover to the target cell is complete, the source cell may be considered as a secondary serving cell, or removed from a set of serving cells, while the target cell may be considered as the new primary serving cell.

Figure 13:
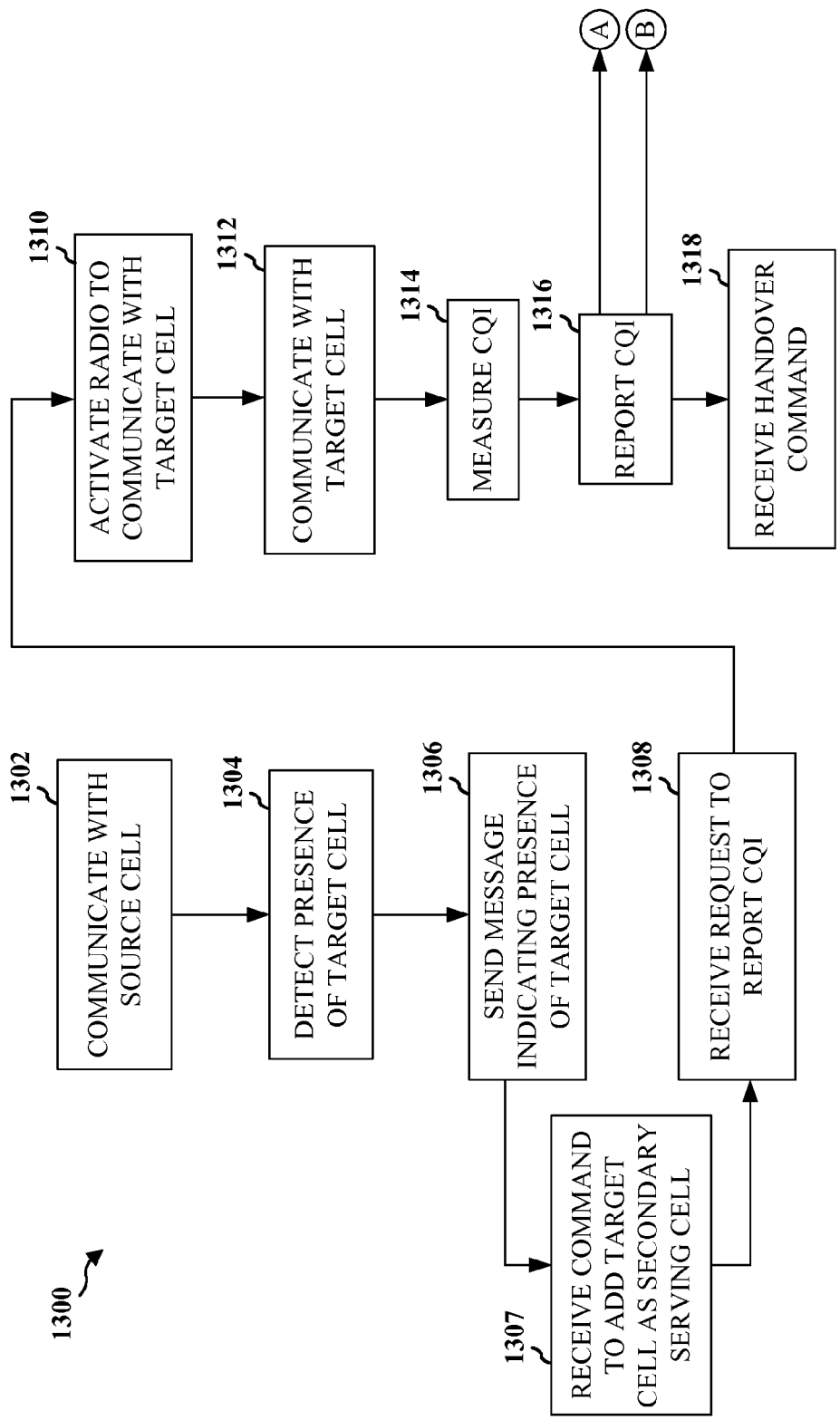
FIG. 13 is a flow chart of a method of wireless communication.

FIG. 13 is a flow chart 1300 of a method of wireless communication. The method may be performed by a UE facilitating a handover from a source cell (e.g., primary serving cell) to a target cell (e.g., secondary serving cell). At step 1302, the UE may communicate with the source cell via a first radio. Channel strength of the source cell may be decreasing while channel strength of the target cell may be increasing.

Accordingly, at step 1304, as the channel strength of the target cell increases, the UE may detect a presence of the target cell. Thereafter, at step 1306, the UE may send a message to the source cell to indicate the detected presence of the target cell. At step 1307, the UE may receive a command from the source cell (primary serving cell) to add the target cell as a secondary serving cell.

At step 1308, after the source cell learns that the UE has detected the presence of the target cell, the UE may receive a message from the source cell requesting the UE to report channel quality information (CQI) related to the source cell and/or the target cell. At step 1310, the UE may activate a second radio to communicate with the target cell. At step 1312, the UE communicates with the target cell and/or the source cell via the second radio to facilitate the handover to the target cell. The first radio and the second radio may operate on a same frequency.

In an aspect, the UE may communicate with the source cell and the target cell via a single radio to facilitate the handover to the target cell. In such a case, the UE communication with the source cell may be time-division multiplexed with the UE communication with the target cell.

In a further aspect, a downlink control channel of the source cell (e.g., PDCCH) may not be used to schedule a target cell downlink transmission. Moreover, an uplink control channel to the source cell may not be used to provide an acknowledgment of the target cell downlink transmission. Also, the uplink control channel to the source cell may not be used to provide channel side information for the target cell downlink transmission. Channel side information (CSI) may include CQI, rank indicator (RI), precoding matrix indicator (PMI). A scheduler may use CSI to decide a modulation and coding scheme (MCS), rank, and power of the transmission.

At step 1314, the UE may measure the CQI related to the target cell via the second radio. Alternatively, if only a single radio is used, then the UE measures the CQI related to the target cell via the single radio. At step 1316, the UE may report, to the source cell, the CQI related to the source cell and the target cell. The source cell may use the reported CQI to make a handover decision. When the source cell decides to handover the UE to the target cell, the source cell negotiates the handover with the target cell. Thereafter, at step 1318, the UE may receive a handover command from at least one of the source cell or the target cell.

Figure 14:
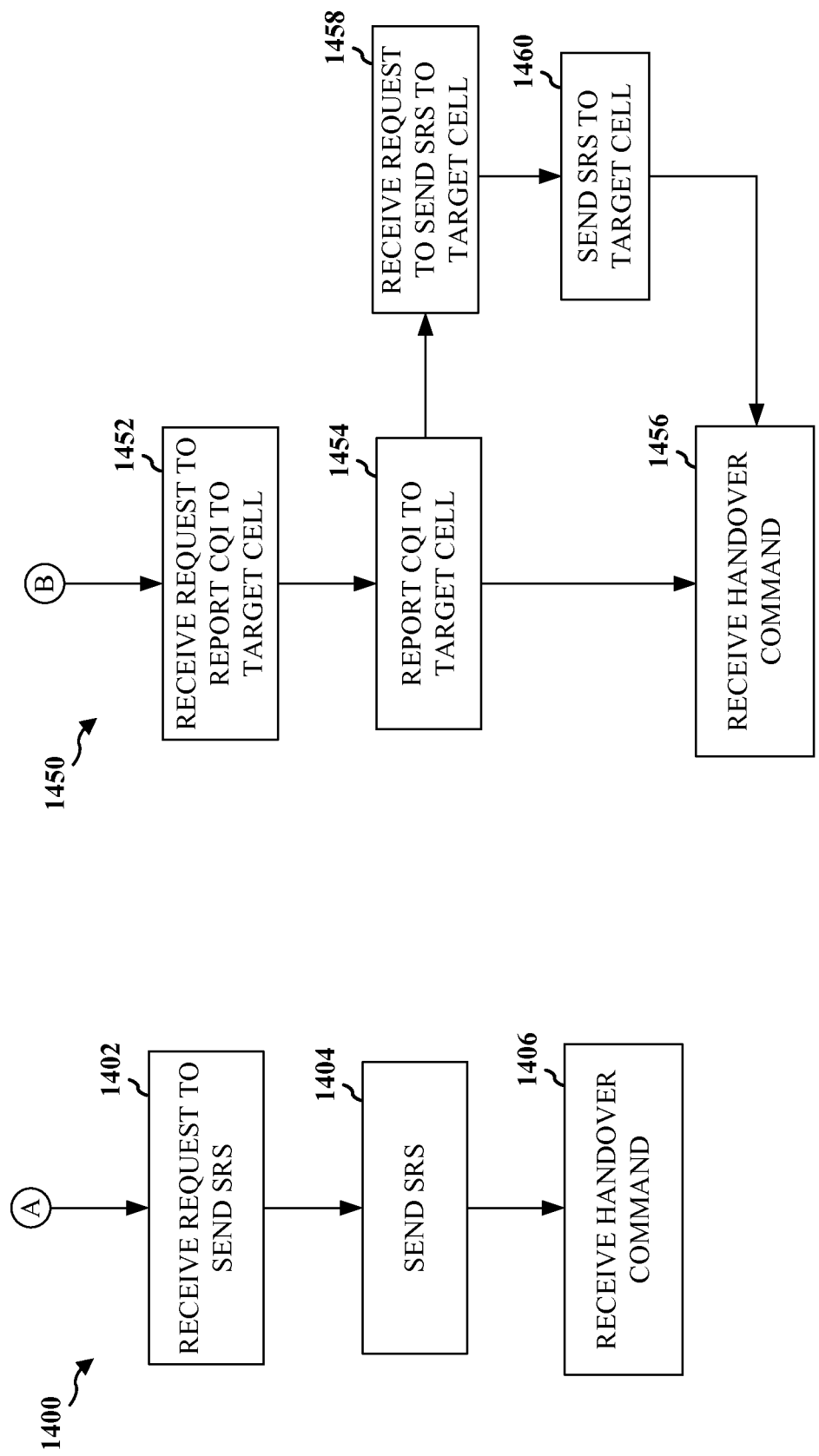
FIG. 14 illustrates flow charts of methods of wireless communication.

Alternatively, after the UE reports the CQI related to the source cell and the target cell at step 1316, the method may proceed to either step 1402 or step 1450 of FIG. 14.

FIG. 14 illustrates flow charts 1400 and 1450 of methods of wireless communication. The methods depicted in the flow charts 1400 and 1450 are alternative continuations to the path stemming from step 1316 of FIG. 13.

Referring to flow chart 1400, at step 1402, the UE may receive a message from the source cell requesting the UE to send a sounding reference signal (SRS) to the target cell. At step 1404, the UE may send the SRS to the target cell. The target cell may use the SRS to make a handover decision. After the target cell negotiates the handover with the source cell, at step 1406, the UE may receive a handover command from at least one of the source cell or the target cell based on at least one of the SRS sent to the target cell or the CQI related to the source cell and the target cell reported to the source cell.

Referring to flow chart 1450, the UE may receive a message from the target cell requesting the UE to report to the target cell the CQI related to the source cell and the target cell. At step 1454, the UE reports, to the target cell, the CQI related to the source cell and the target cell. The target cell may use the reported CQI to make a handover decision. After the target cell negotiates the handover with the source cell, at step 1456, the UE may receive a handover command from at least one of the source cell or the target cell based on at least one of the CQI related to the source cell and the target cell reported to the source cell or the CQI related to the source cell and the target cell reported to the target cell.

Alternatively, after the CQI is reported to the target cell (step 1454), at step 1458, the UE may receive a message from the source cell requesting the UE to send a sounding reference signal (SRS) to the target cell. At step 1460, the UE sends the SRS to the target cell. The target cell may further use the SRS to make the handover decision. Thereafter, at step 1456, the UE may receive a handover command from at least one of the source cell or the target cell based on at least one of the SRS sent to the target cell, the CQI related to the source cell and the target cell reported to the source cell, or the CQI related to the source cell and the target cell reported to the target cell.

Figure 15:
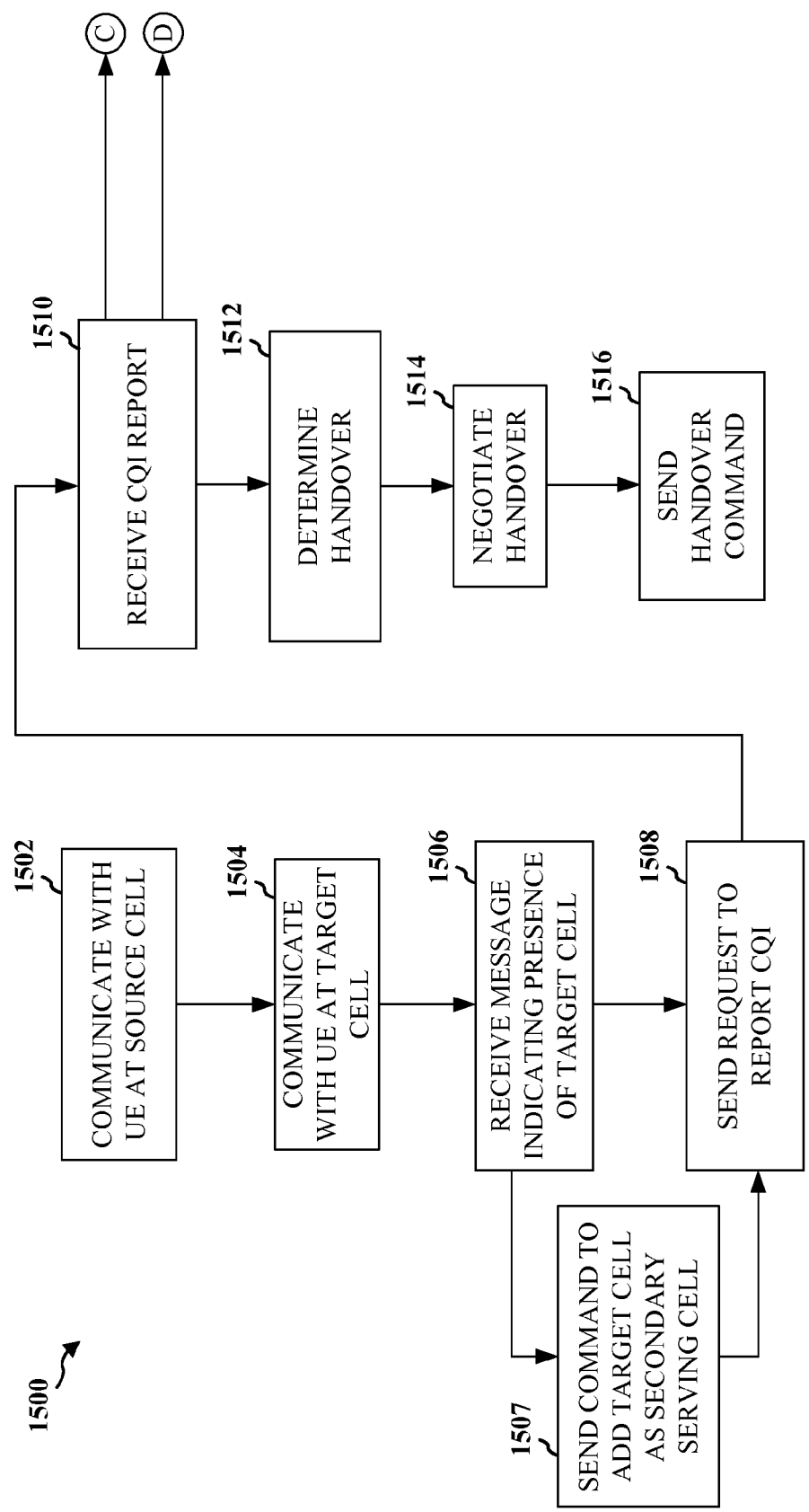
FIG. 15 is a flow chart of a method of wireless communication.

FIG. 15 is a flow chart 1500 of a method of wireless communication. The method may be performed by a source cell (e.g., primary serving cell) and/or a target cell (e.g., secondary serving cell) communicating with a UE. At step 1502, the source cell may communicate with the UE via a first radio. At step 1504, the target cell may communicate with the UE via a second radio. The first radio and the second radio may operate on a same frequency. Moreover, channel strength of the source cell may be decreasing while channel strength of the target cell may be increasing.

Accordingly, at step 1506, the source cell may receive a message from the UE indicating a detected presence of the target cell. In response, at step 1507, the source cell sends a message to the UE commanding the UE to add the target cell as a secondary serving cell. At step 1508, the source cell may send a message to the UE requesting the UE to report channel quality information (CQI) related to the source cell and the target cell. The source cell may use the reported CQI to make a handover decision.

In an aspect, the source cell and the target cell may communicate with the UE via a single radio. In such a case, the communication with the UE at the source cell is time-division multiplexed with the communication with the UE at the target cell.

In a further aspect, a downlink control channel of the source cell (e.g., PDCCH) may not be used to schedule a target cell downlink transmission. Moreover, an uplink control channel to the source cell may not be used to provide an acknowledgment of the target cell downlink transmission. Also, the uplink control channel to the source cell may not be used to provide channel side information for the target cell downlink transmission. Channel side information (CSI) may include CQI, rank indicator (RI), and precoding matrix indicator (PMI). A scheduler may use CSI to decide a modulation and coding scheme (MCS), rank, and power of the transmission.

At step 1510, the source cell receives a report from the UE reporting the CQI related to the source cell and the target cell. At step 1512, the source cell may determine a handover to the target cell based on the received report. When the handover is determined, at step 1514, the source cell and the target cell may negotiate the handover. And at step 1516, the target cell may send a handover command to the UE. The source cell may also send the handover command to the UE separately from the handover command sent from the target cell.

Figure 16:
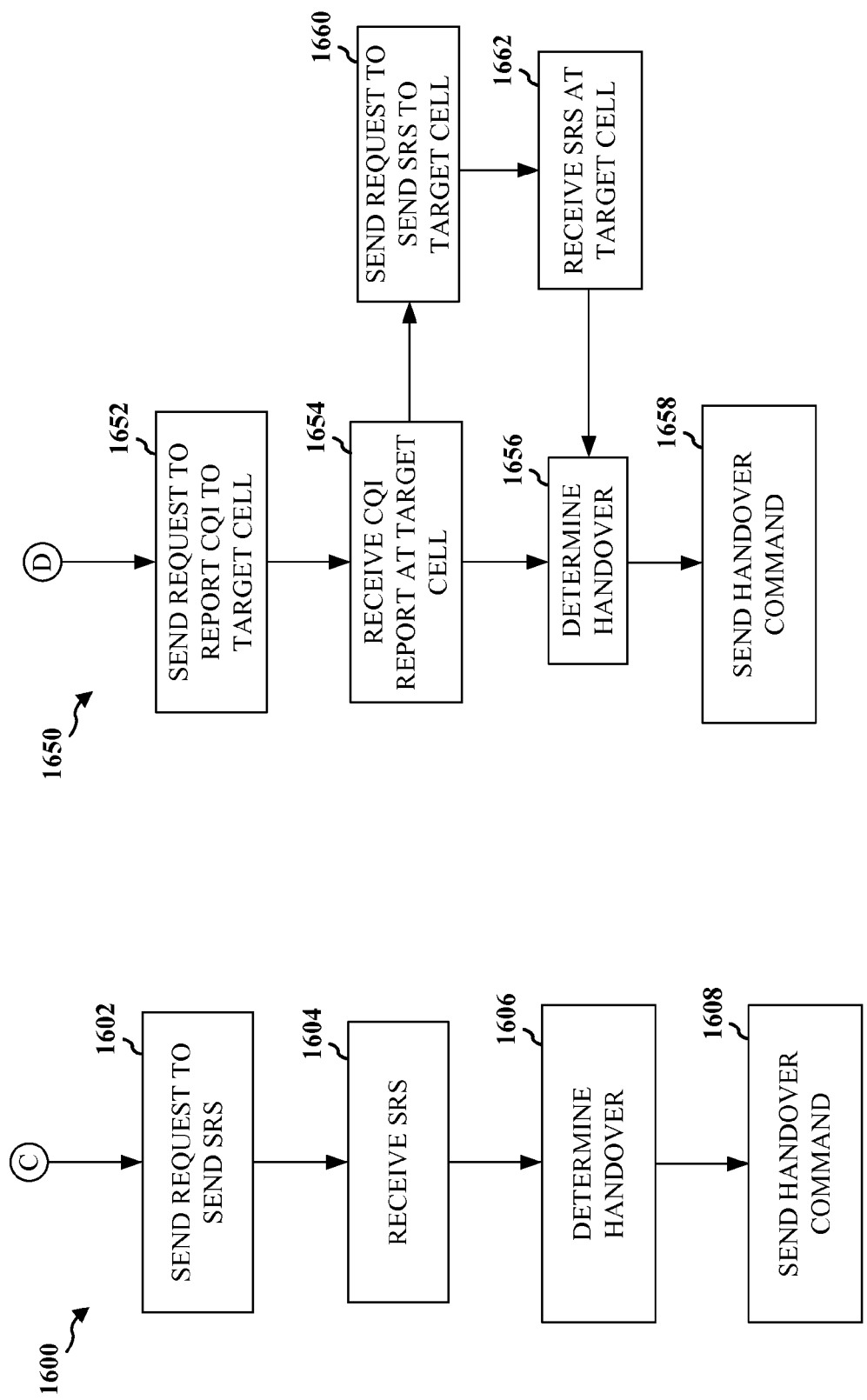
FIG. 16 illustrates flow charts of methods of wireless communication.

Alternatively, after the source cell receives the CQI report at step 1510, the method may proceed to either step 1602 or step 1650 of FIG. 16.

FIG. 16 illustrates flow charts 1600 and 1650 of methods of wireless communication. The methods depicted in the flow charts 1600 and 1650 are alternative continuations to the path stemming from step 1510 of FIG. 15.

Referring to flow chart 1600, at step 1602, the source cell may send a message to the UE requesting the UE to send a sounding reference signal (SRS) to the target cell. At step 1604, the target cell receives the SRS from the UE. At step 1606, handover to the target cell is determined based on at least one of the report received at the source cell reporting the CQI related to the source cell and the target cell or the SRS received at the target cell. At step 1608, a handover command is sent to the UE from at least one of the source cell or the target cell based on at least one of the report received at the source cell reporting the CQI related to the source cell and the target cell or the SRS received at the target cell.

Referring to flow chart 1650, at step 1652, the target cell sends a message to the UE requesting the UE to report to the target cell the CQI related to the source cell and the target cell. At step 1654, the target cell receives the report from the UE reporting the CQI related to the source cell and the target cell. At step 1656, handover to the target cell is determined based on at least one of the report received at the source cell reporting the CQI related to the source cell and the target cell or the report received at the target cell reporting the CQI related to the source cell and the target cell. At step 1658, a handover command is sent to the UE from at least one of the source cell or the target cell based on at least one of the report received at the source cell reporting the CQI related to the source cell and the target cell or the report received at the target cell reporting the CQI related to the source cell and the target cell.

Alternatively, after the target cell receives the CQI report (step 1654), at step 1660, the source cell may send a message to the UE requesting the UE to send a sounding reference signal (SRS) to the target cell. At step 1662, the target cell receives the SRS from the UE. At step 1656, the target cell may determine the handover further based on the received SRS. And at step 1658, a handover command from at least one of the source cell or the target cell may be sent to the UE based on at least one of the report received at the source cell reporting the CQI related to the source cell and the target cell, the report received at the target cell reporting the CQI related to the source cell and the target cell, or the SRS received at the target cell.

Figure 17:
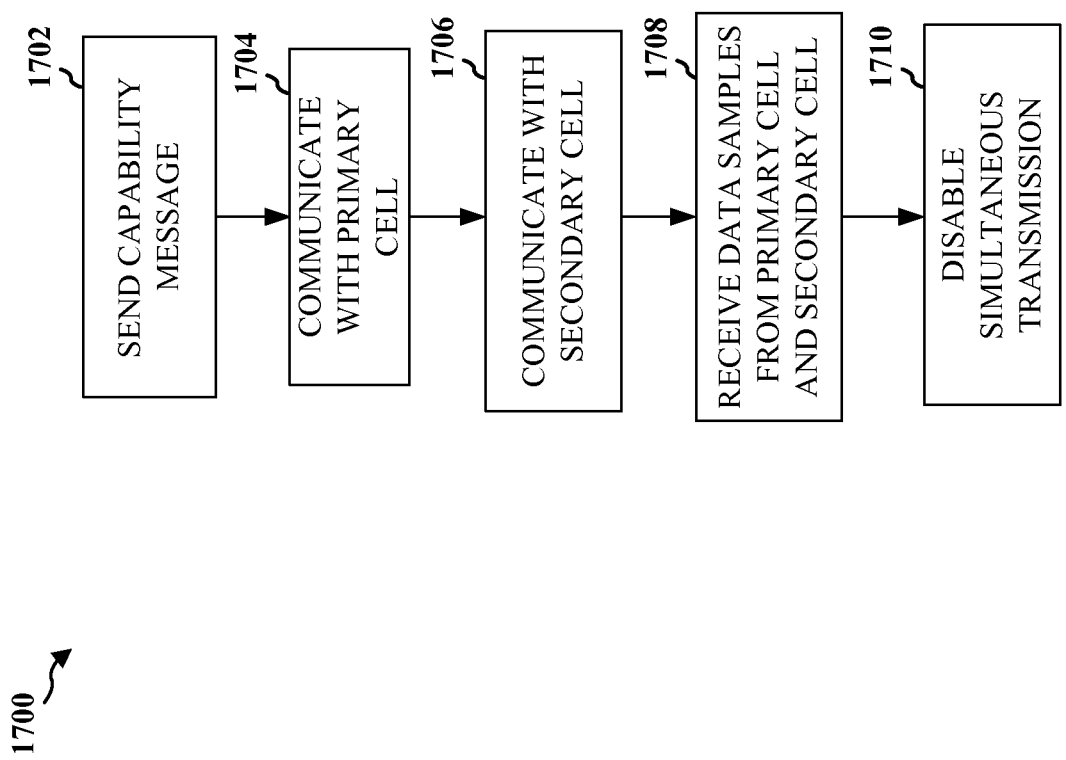
FIG. 17 is a flow chart of a method of wireless communication.

FIG. 17 is a flow chart 1700 of a method of wireless communication. The method may be performed by a UE for receiving data from a primary serving cell and a secondary serving cell. At step 1702, the UE sends a capability message to at least one of the primary cell or the secondary cell. The capability message may indicate a capability of communicating via a first component carrier corresponding to the primary serving cell and a second component carrier corresponding to the secondary serving cell, wherein the first component carrier and the second component carrier operate on the same frequency.

At step 1704, the UE communicates with the primary serving cell via the first component carrier. At step 1706, the UE communicates with the secondary serving cell via the second component carrier. At step 1708, the UE receives data samples from both the primary serving cell and the secondary serving cell. In an aspect, the data samples are received simultaneously from both the primary serving cell and the secondary serving cell when the data samples are simultaneously received via a baseband receiver capable of simultaneously receiving via both the first component carrier and the second component carrier.

In a further aspect, the capability message may indicate whether the baseband receiver is capable of simultaneously receiving via both the first component carrier and the second component carrier. When the baseband receiver cannot simultaneously receive via both the first component carrier and the second component carrier, the UE may receive the data samples from the primary serving cell and the secondary serving cell in a non-simultaneous manner when the data samples from the primary serving cell and the secondary serving cell are time-division multiplexed.

As step 1710, the UE may disable simultaneous transmission via the first component carrier and the second component carrier operating on the same frequency. Communicating with the primary serving cell and the secondary serving cell may be implemented via a single radio or a plurality of radios.

Figure 18:
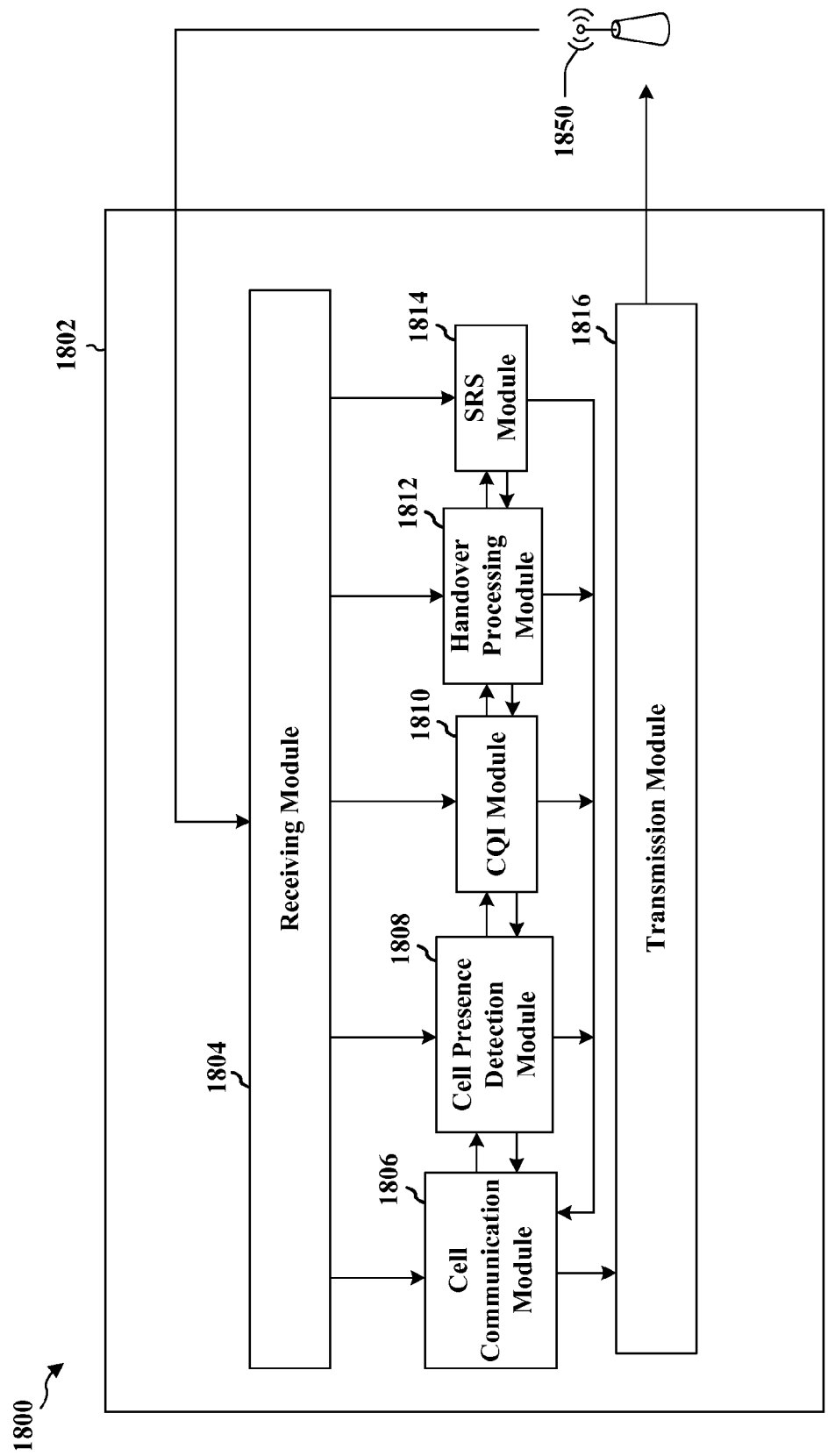
FIG. 18 is a conceptual data flow diagram illustrating the data flow between different modules/means/components in an exemplary apparatus.

FIG. 18 is a conceptual data flow diagram 1800 illustrating the data flow between different modules/means/components in an exemplary apparatus 1802. The apparatus may be a UE. The apparatus includes a receiving module 1804, a cell communication module 1806, a cell presence detection module 1808, a channel quality information (CQI) module 1810, a handover processing module 1812, a sounding reference signal (SRS) module 1814, and a transmission module 1814. In FIG. 18, a base station 1850 may represent a source cell or a target cell.

The cell communication module 1806 may communicate with the source cell (e.g., primary serving cell) via a first radio. Channel strength of the source cell may be decreasing while channel strength of the target cell (e.g., secondary serving cell) may be increasing. Accordingly, as the channel strength of the target cell increases, the cell presence detection module 1808 may detect a presence of the target cell. Thereafter, the cell presence detection module 1808 may send a message to the source cell via the transmission module 1814 to indicate the detected presence of the target cell.

After the source cell learns that the apparatus 1802 has detected the presence of the target cell, the cell communication module 1806 may receive a command from the source cell (primary serving cell) to add the target cell as a secondary serving cell. The CQI module 1810 may receive a message from the source cell requesting the apparatus 1802 to report channel quality information (CQI) related to the source cell and/or the target cell. The cell communication module 1806 may activate a second radio to communicate with the target cell. The cell communication module 1806 communicates with the target cell and/or the source cell via the second radio to facilitate a handover to the target cell. The first radio and the second radio may operate on a same frequency.

In an aspect, the apparatus 1802 may communicate with the source cell and the target cell via a single radio to facilitate the handover to the target cell. In such a case, the communication with the source cell may be time-division multiplexed with the communication with the target cell.

In a further aspect, a downlink control channel of the source cell (e.g., PDCCH) may not be used to schedule a target cell downlink transmission. Moreover, an uplink control channel to the source cell may not be used to provide an acknowledgment of the target cell downlink transmission. Also, the uplink control channel to the source cell may not be used to provide channel side information for the target cell downlink transmission. Channel side information (CSI) may include CQI, rank indicator (RI), precoding matrix indicator (PMI). A scheduler may use CSI to decide a modulation and coding scheme (MCS), rank, and power of the transmission.

The CQI module 1810 may measure the CQI related to the target cell via the second radio. The CQI module 1810 may report, to the source cell, the CQI related to the source cell and the target cell. The source cell may use the reported CQI to make a handover decision. When the source cell decides to handover the UE to the target cell, the source cell negotiates the handover with the target cell. Thereafter, the handover processing module 1812 may receive a handover command from at least one of the source cell or the target cell.

Alternatively, after the CQI module 1810 reports the CQI related to the source cell and the target cell, the SRS module 1814 may receive a message from the source cell requesting the apparatus 1802 to send a sounding reference signal (SRS) to the target cell. The SRS module 1814 may send the SRS to the target cell. The target cell may use the SRS to make a handover decision. After the target cell negotiates the handover with the source cell, the handover processing module 1812 may receive a handover command from at least one of the source cell or the target cell based on at least one of the SRS sent to the target cell or the CQI related to the source cell and the target cell reported to the source cell.

In another alternative, after the CQI module 1810 reports the CQI related to the source cell and the target cell, the CQI module 1810 may receive a message from the target cell requesting the UE to report to the target cell the CQI related to the source cell and the target cell. The CQI module 1810 reports, to the target cell, the CQI related to the source cell and the target cell. The target cell may use the reported CQI to make a handover decision. After the target cell negotiates the handover with the source cell, the handover processing module 1812 may receive a handover command from at least one of the source cell or the target cell based on at least one of the CQI related to the source cell and the target cell reported to the source cell or the CQI related to the source cell and the target cell reported to the target cell.

After the CQI is reported to the target cell, the SRS module 1814 may receive a message from the source cell requesting the apparatus 1802 to send a sounding reference signal (SRS) to the target cell. The SRS module 1814 sends the SRS to the target cell. The target cell may further use the SRS to make the handover decision. Thereafter, the handover processing module 1812 may receive a handover command from at least one of the source cell or the target cell based on at least one of the SRS sent to the target cell, the CQI related to the source cell and the target cell reported to the source cell, or the CQI related to the source cell and the target cell reported to the target cell.

The cell communication module 1806 sends a capability message to at least one of a primary cell or a secondary cell. The capability message may indicate a capability of communicating via a first component carrier corresponding to the primary cell and a second component carrier corresponding to the secondary cell, wherein the first component carrier and the second component carrier operate on the same frequency.

The cell communication module 1806 communicates with the primary cell via the first component carrier and with the secondary cell via the second component carrier. The receiving module 1804 receives data samples from both the primary cell and the secondary cell. In an aspect, the data samples are received simultaneously from both the primary cell and the secondary cell when the data samples are simultaneously received via a baseband receiver capable of simultaneously receiving via both the first component carrier and the second component carrier.

In a further aspect, the capability message may indicate whether the baseband receiver is capable of simultaneously receiving via both the first component carrier and the second component carrier. When the baseband receiver cannot simultaneously receive via both the first component carrier and the second component carrier, the receiving module 1806 may receive the data samples from the primary cell and the secondary cell in a non-simultaneous manner when the data samples from the primary cell and the secondary cell are time-division multiplexed.

The transmission module 1816 may disable simultaneous transmission via the first component carrier and the second component carrier operating on the same frequency. Communicating with the primary cell and the secondary cell may be implemented via a single radio or a plurality of radios.

Figure 19:
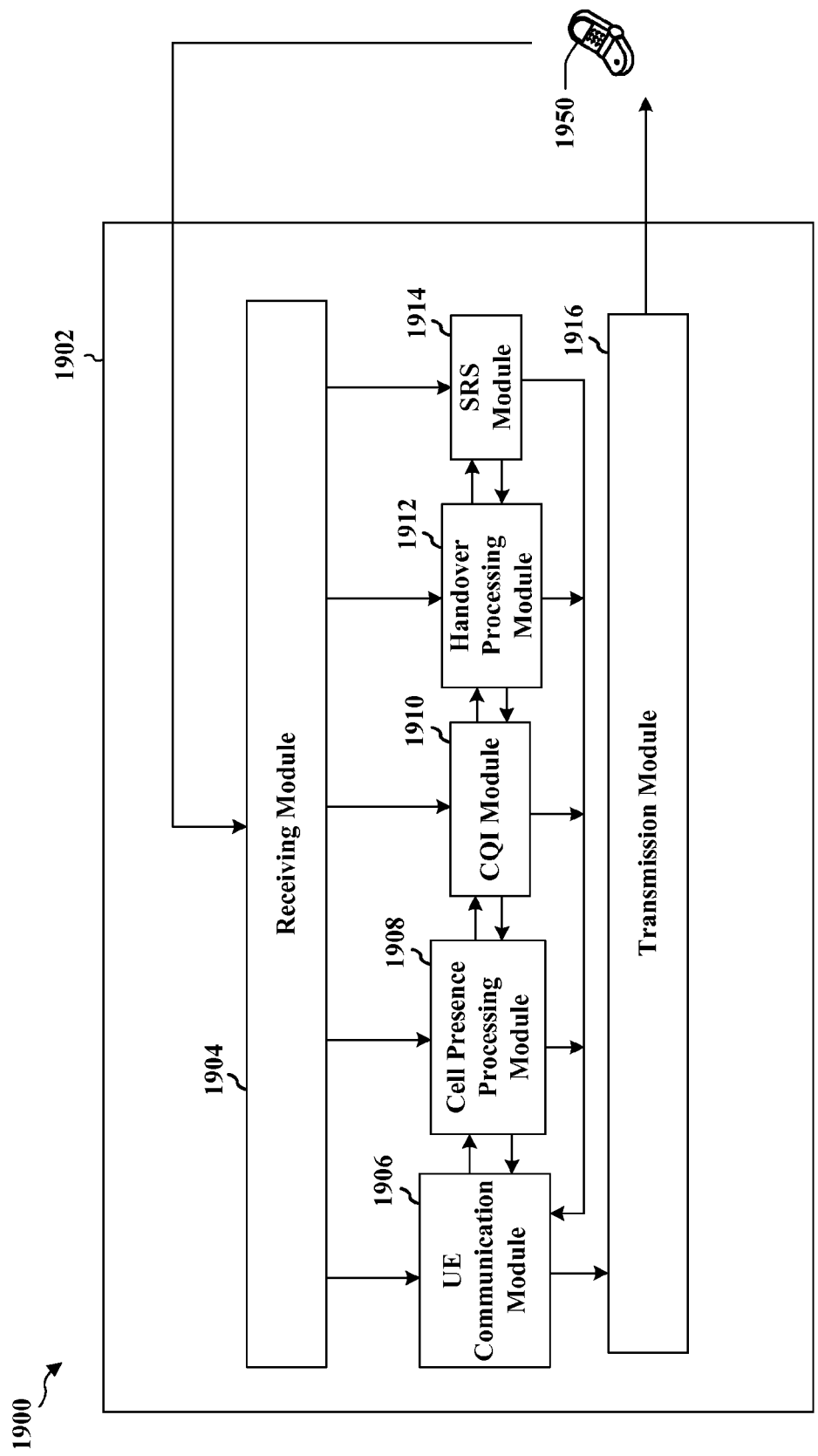
FIG. 19 is a conceptual data flow diagram illustrating the data flow between different modules/means/components in an exemplary apparatus.

FIG. 19 is a conceptual data flow diagram 1900 illustrating the data flow between different modules/means/components in an exemplary apparatus 1902. The apparatus may be a source eNB (e.g., primary serving cell) and/or a target eNB (e.g., secondary serving cell). The apparatus includes a receiving module 1904, a UE communication module 1906, a cell presence processing module 1908, a channel quality information (CQI) module, a handover processing module 1912, a sounding reference signal (SRS) module 1914, and a transmission module 1916.

The UE communication module 1906 of the source eNB may communicate with a UE 1950 via a first radio. The UE communication module 1906 of the target eNB may communicate with the UE via a second radio. The first radio and the second radio may operate on a same frequency. Moreover, channel strength of the source eNB may be decreasing while channel strength of the target eNB may be increasing.

Accordingly, the cell presence processing module 1908 of the source eNB may receive a message from the UE 1950 indicating a detected presence of the target eNB. In response, the UE communication module 1906 of the source eNB may send a message to the UE 1950 commanding the UE 1950 to add the target eNB as a secondary serving cell. The CQI module 1910 of the source eNB may send a message to the UE 1950 requesting the UE 1950 to report channel quality information (CQI) related to the source eNB and the target eNB. The handover processing module 1912 of the source eNB may use the reported CQI to make a handover decision.

In an aspect, the UE communication module 1906 of the source eNB and the UE communication module 1906 of the target eNB may communicate with the UE 1950 via a single radio. In such a case, the communication with the UE 1950 at the source eNB is time-division multiplexed with the communication with the UE at the target eNB.

In a further aspect, a downlink control channel of the source eNB (e.g., PDCCH) may not be used to schedule a target eNB downlink transmission. Moreover, an uplink control channel to the source eNB may not be used to provide an acknowledgment of the target eNB downlink transmission. Also, the uplink control channel to the source eNB may not be used to provide channel side information for the target eNB downlink transmission. Channel side information (CSI) may include CQI, rank indicator (RI), precoding matrix indicator (PMI). A scheduler may use CSI to decide a modulation and coding scheme (MCS), rank, and power of the transmission.

The CQI module 1910 of the source eNB receives a report from the UE 1950 reporting the CQI related to the source eNB and the target eNB. The handover processing module 1912 of the source eNB may determine a handover to the target eNB based on the received report. When the handover is determined, the source eNB and the target eNB may negotiate the handover. The handover processing module 1912 of the target eNB may send a handover command to the UE 1950. The handover processing module 1912 of the source eNB may also send the handover command to the UE 1950 separately from the handover command sent from the target eNB.

Alternatively, after the CQI module 1910 of the source eNB receives the CQI report, the SRS module 1914 of the source eNB may send a message to the UE 1950 requesting the UE 1950 to send a sounding reference signal (SRS) to the target eNB. The SRS module 1914 of the target eNB receives the SRS from the UE 1950. Handover to the target eNB is determined by the handover processing module 1912 based on at least one of the report received at the source eNB reporting the CQI related to the source eNB and the target eNB or the SRS received at the target eNB. The handover processing module 1912 sends a handover command to the UE from at least one of the source eNB or the target eNB based on at least one of the report received at the source eNB reporting the CQI related to the source eNB and the target eNB or the SRS received at the target eNB.

In another alternative, after the CQI module 1910 of the source eNB receives the CQI report, the CQI module 1910 of the target eNB sends a message to the UE 1950 requesting the UE 1950 to report to the target eNB the CQI related to the source eNB and the target eNB. The CQI module 1910 of the target eNB receives the report from the UE 1950 reporting the CQI related to the source eNB and the target eNB. Handover to the target eNB is determined by the handover processing module 1912 based on at least one of the report received at the source eNB reporting the CQI related to the source eNB and the target eNB or the report received at the target eNB reporting the CQI related to the source eNB and the target eNB. The handover processing module 1912 sends a handover command to the UE 1950 from at least one of the source eNB or the target eNB based on at least one of the report received at the source eNB reporting the CQI related to the source eNB and the target eNB or the report received at the target eNB reporting the CQI related to the source eNB and the target eNB.

After the CQI module 1910 of the target eNB receives the CQI report, the SRS module 1914 of the source eNB may alternatively send a message to the UE 1950 requesting the UE 1950 to send a sounding reference signal (SRS) to the target eNB. The SRS module 1914 of the target eNB receives the SRS from the UE 1950. The handover processing module 1912 of the target eNB may determine the handover further based on the received SRS. The handover processing module 1912 may send a handover command to the UE 1950 from at least one of the source eNB or the target eNB based on at least one of the report received at the source eNB reporting the CQI related to the source eNB and the target eNB, the report received at the target eNB reporting the CQI related to the source eNB and the target eNB, or the SRS received at the target eNB.

The apparatus may include additional modules that perform each of the steps of the algorithm in the aforementioned flow charts of FIGS. 13-17. As such, each step in the aforementioned flow charts of FIGS. 13-17 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 20:
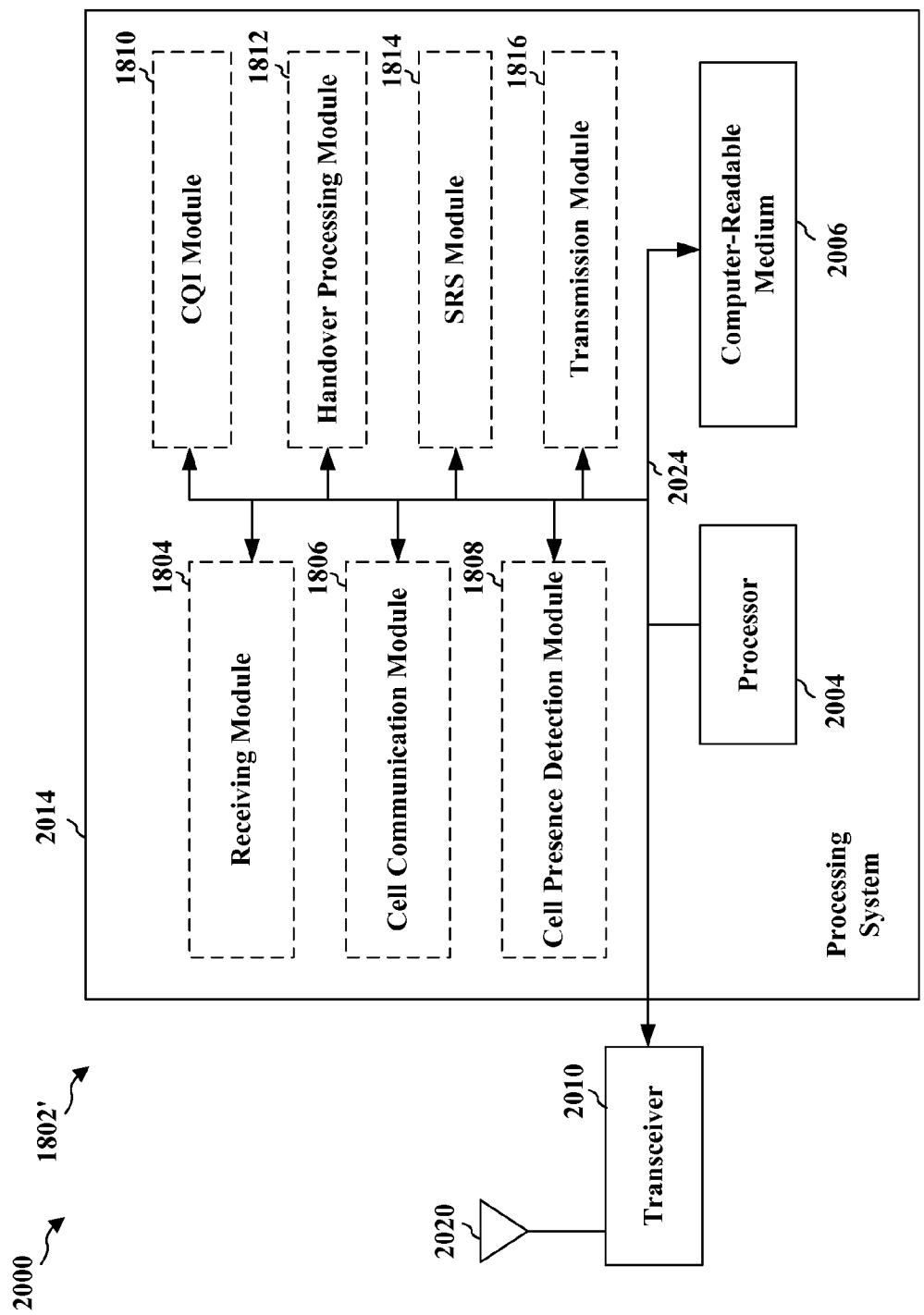
FIG. 20 is a diagram illustrating an example of a hardware implementation for an apparatus employing a processing system.

FIG. 20 is a diagram 2000 illustrating an example of a hardware implementation for an apparatus 1802' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware modules, represented by the processor 2004, the modules 1804, 1806, 1808, 1810, 1812, 1814, 1816, and the computer-readable medium 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The processing system 2014 includes a processor 2004 coupled to a computer-readable medium 2006. The processor 2004 is responsible for general processing, including the execution of software stored on the computer-readable medium 2006. The software, when executed by the processor 2004, causes the processing system 2014 to perform the various functions described supra for any particular apparatus. The computer-readable medium 2006 may also be used for storing data that is manipulated by the processor 2004 when executing software. The processing system further includes at least one of the modules 1804, 1806, 1808, 1810, 1812, 1814, and 1816. The modules may be software modules running in the processor 2004, resident/stored in the computer readable medium 2006, one or more hardware modules coupled to the processor 2004, or some combination thereof. The processing system 2014 may be a component of the UE 650 and may include the memory 660 and/or at least one of the TX processor 668, the RX processor 656, and the controller/processor 659.

In one configuration, the apparatus 1802/1802' for wireless communication includes means for communicating with a source cell via a first radio, means for communicating with at least one of the source cell or a target cell via a second radio to facilitate a handover to the target cell, the first radio and the second radio operating on a same frequency, means for detecting a presence of the target cell, means for sending a first message to the source cell indicating the detected presence of the target cell, means for receiving a command from the source cell to add the target cell as a secondary serving cell, means for receiving a second message from the source cell, the second message including a request to report channel quality information (CQI) related to the source cell and the target cell, means for activating the second radio to communicate with the target cell, means for measuring the CQI related to the target cell via the second radio, means for reporting, to the source cell, the CQI related to the source cell and the target cell, means for receiving a handover command from at least one of the source cell or the target cell, means for measuring the CQI related to the target cell via the second radio, means for reporting, to the source cell, the CQI related to the source cell and the target cell, means for receiving a third message from the source cell, the third message including a request to send a sounding reference signal (SRS) to the target cell, means for sending the SRS to the target cell, the SRS, and the CQI related to the source cell and the target cell, used for determining the handover to the target cell, means for receiving a handover command from at least one of the source cell or the target cell based on at least one of the SRS sent to the target cell or the CQI related to the source cell and the target cell reported to the source cell, means for measuring the CQI related to the target cell via the second radio, means for reporting, to the source cell, the CQI related to the source cell and the target cell, means for receiving a third message from the target cell, the third message including a request to report to the target cell the CQI related to the source cell and the target cell, means for reporting, to the target cell, the CQI related to the source cell and the target cell, the CQI related to the source cell and the target cell used for determining the handover to the target cell, means for receiving a handover command from at least one of the source cell or the target cell based on at least one of the CQI related to the source cell and the target cell reported to the source cell or the CQI related to the source cell and the target cell reported to the target cell, means for receiving a fourth message from the source cell, the fourth message including a request to send a sounding reference signal (SRS) to the target cell, means for sending the SRS to the target cell, the SRS further used for determining the handover to the target cell, means for receiving a handover command from at least one of the source cell or the target cell based on at least one of the SRS sent to the target cell, the CQI related to the source cell and the target cell reported to the source cell, or the CQI related to the source cell and the target cell reported to the target cell, means for communicating with a primary cell via a first component carrier, means for communicating with a secondary cell via a second component carrier, the first component carrier and the second component carrier operating on a same frequency, means for receiving data samples from both the primary cell and the secondary cell, means for disabling simultaneous transmission via the first component carrier and the second component carrier operating on the same frequency, means for sending a capability message to at least one of the primary cell or the secondary cell, the capability message indicating a capability of communicating via the first component carrier and the second component carrier operating on the same frequency, means for sending a capability message to at least one of the primary cell or the secondary cell, the capability message indicating whether a baseband receiver can simultaneously receive via both the first component carrier and the second component carrier, and means for receiving the data samples from both the primary cell and the secondary cell in a non-simultaneous manner when the baseband receiver cannot simultaneously receive via both the first component carrier and the second component carrier, and when the data samples from the primary cell and the secondary cell are time-division multiplexed.

The aforementioned means may be one or more of the aforementioned modules of the apparatus 1802 and/or the processing system 2014 of the apparatus 1802' configured to perform the functions recited by the aforementioned means. As described supra, the processing system 2014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 21:
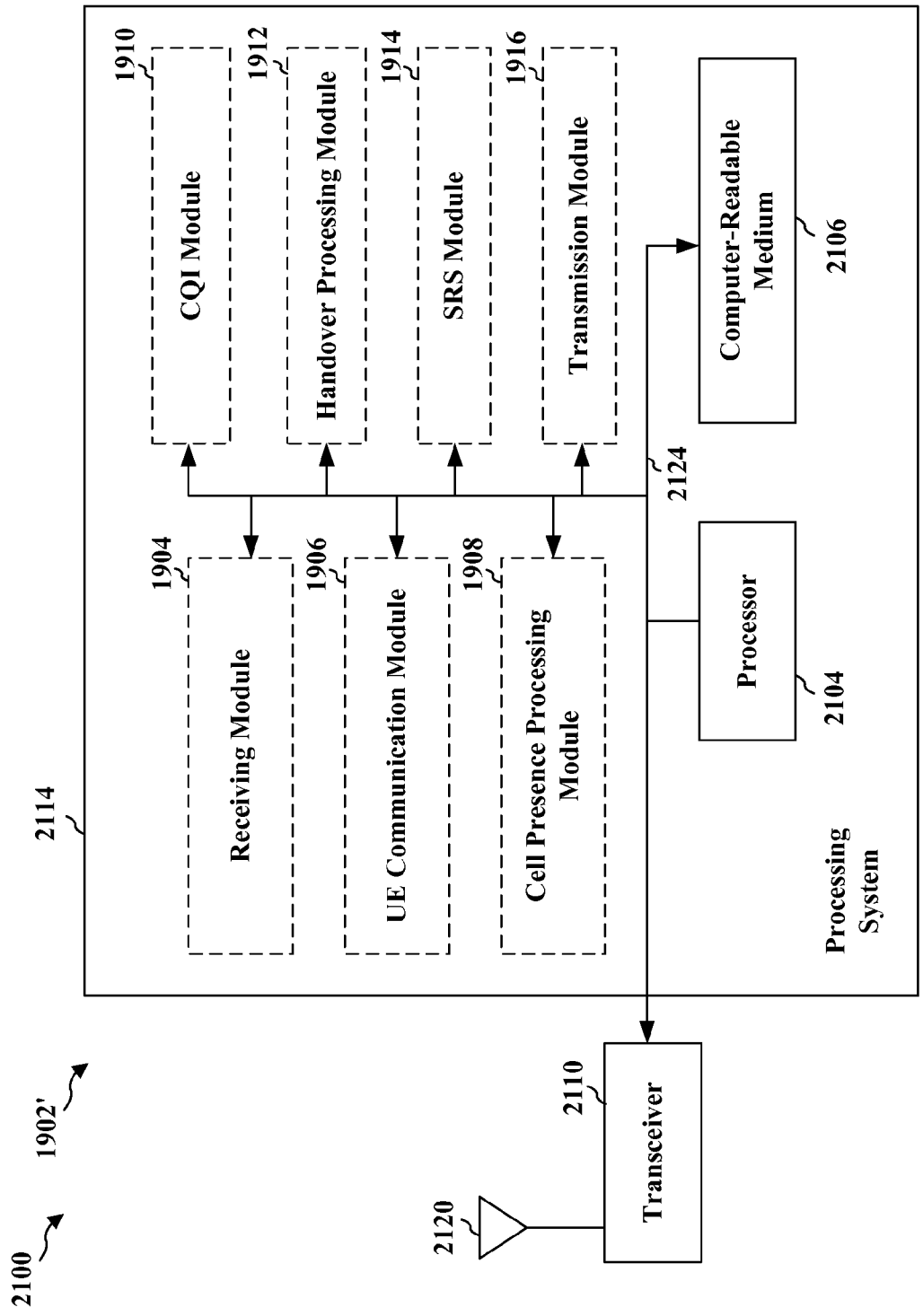
FIG. 21 is a diagram illustrating an example of a hardware implementation for an apparatus employing a processing system.

FIG. 21 is a diagram 2100 illustrating an example of a hardware implementation for an apparatus 1902' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware modules, represented by the processor 2104, the modules 1904, 1906, 1908, 1910, 1912, 1914, 1916, and the computer-readable medium 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The processing system 2114 includes a processor 2104 coupled to a computer-readable medium 2106. The processor 2104 is responsible for general processing, including the execution of software stored on the computer-readable medium 2106. The software, when executed by the processor 2104, causes the processing system 2114 to perform the various functions described supra for any particular apparatus. The computer-readable medium 2106 may also be used for storing data that is manipulated by the processor 2104 when executing software. The processing system further includes at least one of the modules 1904, 1906, 1908, 1910, 1912, 1914, and 1916. The modules may be software modules running in the processor 2104, resident/stored in the computer readable medium 2106, one or more hardware modules coupled to the processor 2104, or some combination thereof. The processing system 2114 may be a component of the eNB 610 and may include the memory 676 and/or at least one of the TX processor 616, the RX processor 670, and the controller/processor 675.

In one configuration, the apparatus 1902/1902' for wireless communication includes means for communicating with a user equipment (UE) via a first radio at a source cell, means for communicating with the UE via a second radio at a target cell, means for receiving, at the source cell, a first message from the UE indicating a detected presence of the target cell, means for sending a second message from the source cell to the UE, the second message including a command to add the target cell as a secondary serving cell, means for sending from the source cell to the UE a request to report channel quality information (CQI) related to the source cell and the target cell, means for receiving, at the source cell, a report from the UE reporting the CQI related to the source cell and the target cell, means for determining, at the source cell, a handover to the target cell based on the received report, means for negotiating the handover between the source cell and the target cell, means for sending, to the UE, a handover command from the target cell upon negotiating the handover, means for sending, to the UE, the handover command from the source cell separately from the handover command sent from the target cell, means for receiving, at the source cell, a report from the UE reporting the CQI related to the source cell and the target cell, means for sending a third message from the source cell to the UE, the third message including a request to send a sounding reference signal (SRS) to the target cell, means for receiving, at the target cell, the SRS from the UE, means for determining a handover to the target cell based on at least one of the report received at the source cell reporting the CQI related to the source cell and the target cell or the SRS received at the target cell, means for sending a handover command from at least one of the source cell or the target cell based on at least one of the report received at the source cell reporting the CQI related to the source cell and the target cell or the SRS received at the target cell, means for receiving, at the source cell, a report from the UE reporting the CQI related to the source cell and the target cell, means for sending a third message from the target cell to the UE, the third message including a request to report to the target cell the CQI related to the source cell and the target cell, means for receiving, at the target cell, the report from the UE reporting the CQI related to the source cell and the target cell, means for determining a handover to the target cell based on at least one of the report received at the source cell reporting the CQI related to the source cell and the target cell or the report received at the target cell reporting the CQI related to the source cell and the target cell, means for sending a handover command from at least one of the source cell or the target cell based on at least one of the report received at the source cell reporting the CQI related to the source cell and the target cell or the report received at the target cell reporting the CQI related to the source cell and the target cell, means for sending a fourth message from the source cell to the UE, the fourth message including a request to send a sounding reference signal (SRS) to the target cell, means for receiving, at the target cell, the SRS from the UE, means for determining the handover to the target cell further based on the SRS received at the target cell, and means for sending a handover command from at least one of the source cell or the target cell based on at least one of the report received at the source cell reporting the CQI related to the source cell and the target cell, the report received at the target cell reporting the CQI related to the source cell and the target cell, or the SRS received at the target cell.

The aforementioned means may be one or more of the aforementioned modules of the apparatus 1902 and/or the processing system 2114 of the apparatus 1902' configured to perform the functions recited by the aforementioned means. As described supra, the processing system 2114 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment (UE), comprising:
    communicating with a primary serving cell via a first radio;
    detecting a presence of a target cell;
    sending a first message to the primary serving cell indicating the detected presence of the target cell;
    receiving a command from the primary serving cell to add the target cell as a secondary serving cell; and
    communicating with at least one of the primary serving cell or the target cell via a second radio to facilitate a handover to the target cell, wherein:
    the first radio and the second radio operate on a same frequency,
    a downlink control channel of the primary serving cell is not used to schedule a target cell downlink transmission,
    an uplink control channel to the primary serving cell is not used to provide an acknowledgment of the target cell downlink transmission, and
    the uplink control channel to the primary serving cell is not used to provide channel side information for the target cell downlink transmission.

2. The method of claim further comprising:
    receiving a second message from the primary serving cell, the second message including a request to report channel quality information (CQI) related to the primary serving cell and the target cell; and
    activating the second radio to communicate with the target cell.

3. The method of claim 2, further comprising:
    measuring the CQI related to the target cell via the second radio; and
    reporting, to the primary serving cell, the CQI related to the primary serving cell and the target cell.

4. The method of claim 1, further comprising:
    receiving a handover command from at least one of the primary serving cell or the target cell.

5. The method of claim 2, further comprising:
    measuring the CQI related to the target cell via the second radio;
    reporting, to the primary serving cell, the CQI related to the primary serving cell and the target cell;
    receiving a third message from the primary serving cell, the third message including a request to send a sounding reference signal (SRS) to the target cell; and
    sending the SRS to the target cell,
    the SRS, and the CQI related to the primary serving cell and the target cell, used for determining the handover to the target cell.

6. The method of claim 5, further comprising:
    receiving a handover command from at least one of the primary serving cell or the target cell based on at least one of the SRS sent to the target cell or the CQI related to the primary serving cell and the target cell reported to the primary serving cell.

7. The method of claim 2, further comprising:
    measuring the CQI related to the target cell via the second radio;
    reporting, to the primary serving cell, the CQI related to the primary serving cell and the target cell;
    receiving a third message from the target cell, the third message including a request report to the target cell the CQI related to the primary serving cell and the target cell; and
    reporting, to the target cell, the CQI related to the primary serving cell and the target cell,
    the CQI related to the primary serving cell and the target cell used for determining the handover to the target cell.

8. The method of claim 7, further comprising:
    receiving a handover command from at least one of the primary serving cell or the target cell based on at least one of the CQI related to the primary serving cell and the target cell reported to the primary serving cell or the CQI related to the primary serving cell and the target cell reported to the target cell.

9. The method of claim 7, further comprising:
receiving a fourth message from the primary serving cell, the fourth message including a request to send a sounding reference signal (SRS) to the target cell; and
sending the SRS to the target cell,
the SRS further used for determining the handover to the target cell.

10. The method of claim 9, further comprising:
receiving a handover command from at least one of the primary serving cell or the target cell based on at least one of the SRS sent to the target cell, the CQI related to the primary serving cell and the target cell reported to the primary serving cell, or the CQI related to the primary serving cell and the target cell reported to the target cell.

11. An apparatus for wireless communication, comprising:
means for communicating with a primary serving cell via a first radio;
means for detecting a presence of a target cell;
means for sending a first message to the primary serving cell indicating the detected presence of the target cell;
means for receiving a command from the primary serving cell to add the target cell as a secondary serving cell; and
means for communicating with at least one of the primary serving cell or the target cell via a second radio to facilitate a handover to the target cell, wherein:
the first radio and the second radio operate on a same frequency,
a downlink control channel of the primary serving cell is not used to schedule a target cell downlink transmission,
an uplink control channel to the primary serving cell is not used to provide an acknowledgment of the target cell downlink transmission, and
the uplink control channel to the primary serving cell is not used to provide channel side information for the target cell downlink transmission.

12. The apparatus of claim 11, further comprising:
means for receiving a second message from the primary serving cell, the second message including a request to report channel quality information (CQI) related to the primary serving cell and the target cell; and
means for activating the second radio to communicate with the target cell.

13. The apparatus of claim 12, further comprising:
means for measuring the CQI related to the target cell via the second radio; and
means for reporting, to the primary serving cell, the CQI related to the primary serving cell and the target cell.

14. The apparatus of claim 11, further comprising:
means for receiving a handover command from at least one of the primary serving cell or the target cell.

15. The apparatus of claim 12, further comprising:
means for measuring the CQI related to the target cell via the second radio;
means for reporting, to the primary serving cell, the CQI related to the primary serving cell and the target cell;
means for receiving a third message from the primary serving cell, the third message including a request to send a sounding reference signal (SRS) to the target cell; and
means for sending the SRS to the target cell,
the SRS, and the CQI related to the primary serving cell and the target cell, used for determining the handover to the target cell.

16. The apparatus of claim 15, further comprising:
means for receiving a handover command from at least one of the primary serving cell or the target cell based on at least one of the SRS sent to the target cell or the CQI related to the primary serving cell and the target cell reported to the primary serving cell.

17. The apparatus of claim 12, further comprising:
means for measuring the CQI related to the target cell via the second radio;
means for reporting, to the primary serving cell, the CQI related to the primary serving cell and the target cell;
means for receiving a third message from the target cell, the third message including a request to report to the target cell the CQI related to the primary serving cell and the target cell; and
means for reporting, to the target cell, the CQI related to the primary serving cell and the target cell,
the CQI related to the primary serving cell and the target cell used for determining the handover to the target cell.

18. The apparatus of claim 17, further comprising:
means for receiving a handover command from at least one of the primary serving cell or the target cell based on at least one of the CQI related to the primary serving cell and the target cell reported to the primary serving cell or the CQI related to the primary serving cell and the target cell reported to the target cell.

19. The apparatus of claim 17, further comprising:
means for receiving a fourth message from the primary serving cell, the fourth message including a request to send a sounding reference signal (SRS) to the target cell; and
means for sending the SRS to the target cell,
the SRS further used for determining the handover to the target cell.

20. The apparatus of claim 19, further comprising:
means for receiving a handover command from at least one of the primary serving cell or the target cell based on at least one of the SRS sent to the target cell, the CQI related to the primary serving cell and the target cell reported to the primary serving cell, or the CQI related to the primary serving cell and the target cell reported to the target cell.

21. An apparatus for wireless communication, comprising:
a processing system configured to:
communicate with a primary serving cell via a first radio;
detect a present of a target cell;
send a first message to the primary serving cell indicating the detected presence of the target cell;
receive a command from the primary serving cell to add the target cell as a secondary serving cell; and
communicate with at least one of the primary serving cell or the target cell via a second radio to facilitate a handover to the target cell, wherein:
the first radio and the second radio operate on a same frequency,
a downlink control channel of the primary serving cell is not used to schedule a target cell downlink transmission,
an uplink control channel to the primary serving cell is not used to provide an acknowledgment of the target cell downlink transmission, and
the uplink control channel to the primary serving cell is not used to provide channel side information for the target cell downlink transmission.

22. The apparatus of claim 21, the processing system further configured to:
receive a second message from the primary serving cell, the second message including a request to report channel quality information (CQI) related to the primary serving cell and the target cell; and
activate the second radio to communicate with the target cell.

23. The apparatus of claim 22, the processing system further configured to:
measure the CQI related to the target cell via the second radio; and
report, to the primary serving cell, the CQI related to the primary serving cell and the target cell.

24. The apparatus of claim 21, the processing system further configured to:
receive a handover command from at least one of the primary serving cell or the target cell.

25. The apparatus of claim 22, the processing system further configured to:
measure the CQI related to the target cell via, the second radio;
report, to the primary serving cell, the CQI related to the primary serving cell and the target cell;
receive a third message from the primary serving cell, the third message including a request to send a sounding reference signal (SRS) to the target cell; and
send the SRS to the target cell,
the SRS, and the CQI related to the primary serving cell and the target cell, used for determining the handover to the target cell.

26. The apparatus of claim 25, the processing system further configured to:
receive a handover command from at least one of the primary serving cell or the target cell based on at least one of the SRS sent to the target cell or the CQI related to the primary serving cell and the target cell reported to the primary serving cell.

27. The apparatus of claim 22, the processing system further configured to:
measure the CQI related to the target cell via the second radio;
report, to the primary serving cell, the CQI related to the primary serving cell and the target cell;
receive a third message from the target cell, the third message including a request to report to the target cell the CQI related to the primary serving cell and the target cell; and
report, to the target cell, the CQI related to the primary serving cell and the target cell,
the CQI related to the primary serving cell and the target cell used for determining the handover to the target cell.

28. The apparatus of claim 27, the processing system further configured to:
receive a handover command from at least one of the primary serving cell or the target cell based on at least one of the CQI related to the primary serving cell and the target cell reported to the primary serving cell or the CQI related to the primary serving cell and the target cell reported to the target cell.

29. The apparatus of claim 27, the processing system further configured to:
receive a fourth message from the primary serving cell, the fourth message including a request to send a sounding reference signal (SRS) to the target cell; and
send the SRS to the target cell,
the SRS further used for determining the handover to the target cell.

30. The apparatus of claim 29, the processing system further configured to:
receive a handover command from at least one of the primary serving cell or the target cell based on at least one of the SRS sent to the target cell, the CQI related to the primary serving cell and the target cell reported to the primary serving cell, or the CQI related to the primary serving cell and the target cell reported to the target cell.

31. A non-transitory computer-readable medium storing computer executable code, comprising code to:
communicate with a primary serving cell via a first radio;
detect a presence of a target cell;
send a first message to the primary serving cell indicating the detected presence of the target cell;
receive a command from the primary serving cell to add the target cell as a secondary serving cell; and
communicate with at least one of the primary serving cell or the target cell via, a second radio to facilitate a handover to the target cell, wherein:
the first radio and the second radio operate on a same frequency,
a downlink control channel of the primary serving cell is not used to schedule a target cell downlink transmission,
an uplink control channel to the primary serving cell is not used to provide an acknowledgment of the target cell downlink transmission, and
the uplink control channel to the primary serving cell is not used to provide channel side information for the target cell downlink transmission.

* * * * *